(12) United States Patent
Song et al.

(10) Patent No.: US 12,179,841 B2
(45) Date of Patent: Dec. 31, 2024

(54) CHASSIS COLLISION STRUCTURE FOR NEW ENERGY VEHICLE

(71) Applicant: GREAT WALL MOTOR COMPANY LIMITED, Baoding (CN)

(72) Inventors: Yonghui Song, Baoding (CN); Weidong Ding, Baoding (CN); Yanmeng Song, Baoding (CN); Wei Wang, Baoding (CN); Ming Chi, Baoding (CN); Changjian Cai, Baoding (CN); Chao Ji, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 351 days.

(21) Appl. No.: 17/765,369

(22) PCT Filed: Dec. 22, 2020

(86) PCT No.: PCT/CN2020/138338
§ 371 (c)(1),
(2) Date: Mar. 30, 2022

(87) PCT Pub. No.: WO2021/129615
PCT Pub. Date: Jul. 1, 2021

(65) Prior Publication Data
US 2022/0340206 A1    Oct. 27, 2022

(30) Foreign Application Priority Data
Dec. 27, 2019    (CN) .......................... 201911373623.2

(51) Int. Cl.
*B62D 21/15*    (2006.01)
*B60K 1/04*    (2019.01)

(52) U.S. Cl.
CPC .............. *B62D 21/155* (2013.01); *B60K 1/04* (2013.01); *B60K 2001/0438* (2013.01)

(58) Field of Classification Search
CPC .... B62D 21/155; B62D 21/11; B62D 21/152; B60K 1/04; B60K 2001/0438;
(Continued)

(56) References Cited

U.S. PATENT DOCUMENTS 6,298,936 B1 * 10/2001 Yoshida ............... B60K 5/1216
267/140.11
8,684,382 B2 * 4/2014 Buschjohann ......... B62D 21/11
180/311
(Continued)

FOREIGN PATENT DOCUMENTS

CN    101254741 A    9/2008
CN    203958312 U    11/2014
(Continued)

OTHER PUBLICATIONS

Search Report dated Mar. 26, 2021 issued in corresponding International Application No. PCT/CN2020/138338.
(Continued)

*Primary Examiner* — James A English
(74) *Attorney, Agent, or Firm* — Nath, Goldberg & Meyer; Joshua B. Goldberg

(57) ABSTRACT

The present disclosure provides a chassis collision structure of a new energy vehicle, comprising a front lower collision beam assembly, a front sub-frame assembly, a front battery pack bottom fender, a rear battery pack bottom fender, and a rear sub-frame assembly which are arranged sequentially along a direction from a head to a tail of a vehicle, wherein the front lower collision beam assembly is connected to a front end of the front sub-frame assembly; the front battery pack bottom fender is connected to a bottom of the front sub-frame assembly; the rear battery pack bottom fender is connected to a bottom of the rear sub-frame assembly; and connecting parts which are connected with a battery pack are arranged at one end of the front battery pack bottom fender (Continued)

and one end of the rear battery pack bottom fender, which are close to each other, respectively.

19 Claims, 16 Drawing Sheets

(58) Field of Classification Search
CPC .............. B60Y 2306/01; B60R 19/34; B60R 2021/23386; B60R 2021/23146; B60R 21/231; B60R 21/2338
See application file for complete search history.

(56) References Cited

U.S. PATENT DOCUMENTS

| | | | | |
|---|---|---|---|---|
| 8,739,910 | B2* | 6/2014 | Katayama | B62D 21/152 180/311 |
| 9,937,781 | B1* | 4/2018 | Bryer | B62D 35/02 |
| 9,975,416 | B2* | 5/2018 | Hara | B62D 25/20 |
| 10,279,693 | B2 | 5/2019 | Shimizu | |
| 2006/0001228 | A1* | 1/2006 | Yoshimura | B62D 21/155 280/124.109 |
| 2006/0181071 | A1* | 8/2006 | Mitsui | B62D 25/08 280/784 |
| 2007/0024044 | A1* | 2/2007 | Ogawa | B60G 3/20 267/293 |
| 2010/0019518 | A1* | 1/2010 | Stewart | B60R 19/34 293/133 |
| 2012/0319389 | A1* | 12/2012 | Takahashi | B62D 21/11 280/781 |
| 2015/0273963 | A1* | 10/2015 | Zandbergen | B60G 13/005 280/124.135 |
| 2017/0001667 | A1* | 1/2017 | Ashraf | B60K 1/00 |
| 2018/0105062 | A1 | 4/2018 | Fees et al. | |
| 2019/0185058 | A1* | 6/2019 | Kirtland | B60G 7/02 |
| 2019/0291785 | A1 | 9/2019 | Nagano et al. | |
| 2020/0102014 | A1* | 4/2020 | Sakai | B62D 21/07 |
| 2020/0307698 | A1* | 10/2020 | Kawai | B62D 21/03 |
| 2020/0391797 | A1* | 12/2020 | Viereck | B60K 1/00 |

FOREIGN PATENT DOCUMENTS

| | | |
|---|---|---|
| CN | 205009957 U | 2/2016 |
| CN | 106379413 A | 2/2017 |
| CN | 206125163 U | 4/2017 |
| CN | 107021135 A | 8/2017 |
| CN | 207697812 U | 8/2018 |
| CN | 208827572 U | 5/2019 |
| CN | 209150176 U | 7/2019 |
| CN | 209581624 U | 11/2019 |
| CN | 111038591 A | 4/2020 |
| DE | 102017007406 A1 | 2/2019 |
| EP | 3459828 A1 | 3/2019 |
| EP | 3197756 B1 | 7/2019 |
| KR | 20130033000 A | 4/2013 |

OTHER PUBLICATIONS

Office Action dated Feb. 18, 2021 issued in corresponding Chinese Application No. 201911373623.2.
Office Action dated Aug. 26, 2021 issued in corresponding Chinese Application No. 201911373623.2.
Office Action dated Dec. 7, 2021 issued in corresponding Chinese Application No. 201911373623.2.
Extended European Search Report issued on Oct. 14, 2022, for application No. EP 20907606.6.

* cited by examiner

CHASSIS COLLISION STRUCTURE FOR NEW ENERGY VEHICLE

CROSS REFERENCE TO RELEVANT APPLICATIONS

This is a National Phase Application filed under 35 U.S.C. 371 as a national stage of PCT/CN2020/138338, filed Dec. 22, 2020, an application claiming the benefit of Chinese Application No. 201911373623.2, filed Dec. 27, 2019, the content of each of which is hereby incorporated by reference in its entirety.

TECHNICAL FIELD

The present disclosure relates to the technical field of vehicles, in particular relates to a chassis collision structure of a new energy vehicle.

BACKGROUND

With the increasingly stringent vehicle emission regulations in various countries and the rapid development of electric vehicle technologies, new energy vehicle models with power batteries as a sole or part of energy sources have already been paid more and more attention. Taking battery electric vehicles with the power batteries as the energy sources as an example, requirements on the mounting performance of powertrains are higher due to large start-up torques of the vehicles using electrically driven modes, which also results in higher strength performance target of front sub-frames of the vehicles; and meanwhile, as motors and battery packs of the whole vehicles are electrical elements, it is very important to know how to protect them reasonably during collisions.

At present, most new energy vehicles are equipped with full-frame sub-frames, and in order to ensure the performance, their dimensions and weights are larger, which will affect the collision performance of sub-frames arising from the adverse deformation of sub-frames during collisions. In addition, the existing new energy vehicle models, in most cases, only have force-transfer passages on bodies, which may not meet requirements in MPDB, and other collision conditions; and as the new energy vehicle models, it is especially important for the protection on the battery packs and relevant connectors. However, the battery packs, in most cases, are protected by plastic guard boards, and sometimes, are even exposed without protection, in the existing new energy vehicles, resulting in large security risks during collisions or dragging bottom.

SUMMARY

In view of the above, the present disclosure aims to provide a chassis collision structure of a new energy vehicle to improve an collision performance of a chassis of the new energy vehicle.

In order to achieve the above objectives, the technical solution of the present disclosure is achieved as follows:

The chassis collision structure of the new energy vehicle wherein the chassis collision structure of a new energy vehicle includes a front lower collision beam assembly, a front sub-frame assembly, a front battery pack bottom fender, a rear battery pack bottom fender, and a rear sub-frame assembly which are arranged sequentially along a direction from a head to a tail of the vehicle, wherein the front lower collision beam assembly is connected to a front end of the front sub-frame assembly; the front battery pack bottom fender is connected to a bottom of the front sub-frame assembly; the rear battery pack bottom fender is connected to a bottom of the rear sub-frame assembly; and connecting parts which are connected with a battery pack are arranged at one end of the front battery pack bottom fender and one end of the rear battery pack bottom fender, which are close to each other, respectively.

Further, the front lower collision beam assembly includes energy-absorbing boxes which are arranged on two sides, and a front lower collision beam which is connected with the energy-absorbing boxes on the two sides; and a length of the front lower collision beam, which is located between centers of the energy-absorbing boxes on the two sides, is larger than 50% of an overall width of the vehicle.

Further, the front sub-frame assembly includes longitudinal beams of sub-frame, which are arranged on the two sides, a front cross member of sub-frame, which is connected between the longitudinal beams of sub-frame on the two sides and is close to a front end of each of the longitudinal beams of sub-frame, and a rear cross member of sub-frame, which is close to a rear end of each of the longitudinal beams of sub-frame with respect to the front cross beam of sub-frame; body connecting parts are arranged on each longitudinal beam of sub-frame; and the front sub-frame assembly further includes two powertrain front mounting installation parts which are arranged relatively on the two sides, and a powertrain rear mounting installation part which is arranged on the rear cross beam of sub-frame.

Further, body connecting parts on the longitudinal beams of sub-frame includes a front connecting part of body, a middle connecting part of body, and a rear connecting part of body which are arranged on each of the longitudinal beams of sub-frame along a length direction of each of the longitudinal beams of sub-frame; and the powertrain front mounting installation part on each side is arranged close to a junction of the front cross beam of sub-frame and the longitudinal beam of sub-frame on the side, and is provided with a front cross beam installation position arranged at the front cross beam of sub-frame, and a longitudinal beam installation position arranged at each of the longitudinal beams of sub-frame; and the powertrain rear mounting installation part is located in the middle of the rear cross beam of sub-frame in a length direction.

Further, a front installation position support is fixedly connected to a front end of each of the longitudinal beams of sub-frame; each front connecting part of body is a front installation drive pipe arranged on the front installation position support; the front installation drive pipe is located right above the corresponding longitudinal beams of sub-frame, and a tool pass-through part, which directly faces the front installation drive pipe, for an external installation tool to pass through is arranged on the corresponding front longitudinal beam of sub-frame.

Further, a front mounting support which extends towards an inside of the longitudinal beam of sub-frame is fixedly connected to the longitudinal beam of sub-frame on one side; the longitudinal beam installation position at a position of the longitudinal beam of sub-frame on the side is arranged on the front mounting support; and the powertrain rear mounting installation part is provided with a plurality of rear cross beam installation positions which are distributed on the rear cross beam of sub-frame regularly.

Further, stabilization bar installation positions, large bushing installation positions of swing arms, and small bushing installation positions of swing arms which are opposite to each other are arranged on the longitudinal beams of sub-frame on the two sides; steering gear installation positions are arranged on the rear cross beam of sub-frame; and installation positions of front battery pack bottom fender are arranged on one side of the rear cross beam of sub-frame, which is back on to the front cross beam of sub-frame.

Further, the large bushing installation positions of swing arms are colinear with the stabilization bar installation positions along a length direction of each of the longitudinal beams of sub-frame, and the stabilization bar installation positions are located on a top of the longitudinal beams of sub-frame; the large bushing installation positions of swing arms are provided with first large bushing installation points and second large bushing installation points which are arranged at intervals along the length direction of the longitudinal beams of sub-frame; the first large bushing installation points are close to the stabilization bar installation positions and run through a bottom of the longitudinal beams of sub-frame; and the second large bushing installation points run through the longitudinal beams of sub-frame from top to bottom.

Further, a plurality of collapsing deformation intervals which are arranged along a length direction of the longitudinal beams of sub-frame are arranged on the longitudinal beams of sub-frame; each collapsing deformation interval is provided with a front interval located on a front end of each of the longitudinal beams of sub-frame, a middle interval close to a middle of each of the longitudinal beams of sub-frame, and a rear interval located on a rear end of each of the longitudinal beams of sub-frame, and a collapsing rib is arranged on the longitudinal beam of sub-frame at the middle interval; and a strip deformation guide port is formed in the longitudinal beam of sub-frame at the rear interval.

Further, a front cross beam inclined plane which inclines towards an outside of the cross beam of sub-frame is formed on an upper part of one side of the front cross beam of sub-frame, which directly faces the rear cross beam of sub-frame; a curb stone entry part which extends outwards is arranged on one side of the rear cross beam of sub-frame, which directly faces the front cross beam of sub-frame, and an up-dip upper inclined plane of the rear cross beam and a down-dip lower inclined plane of the rear cross beam are constructed at a top and a bottom of the rear cross beam of sub-frame and the curb stone entry part which are connected, respectively; a planar lifting contact part is arranged at a bottom of the rear cross beam of sub-frame; and a front battery pack fender connecting part which extends outwards is arranged on one side, which is back on to the front cross beam of sub-frame, of the rear cross beam of sub-frame.

Further, the front battery pack bottom fender is in a triangular shape; and a front sub-frame connecting part is arranged at a position of a vertex angle close to the front battery pack bottom fender; and the connecting parts which are connected with the battery pack are arranged along an edge of the front battery pack bottom fender, which directly faces the front sub-frame connecting part.

Further, the rear battery pack bottom fender includes a bottom fender body which consists of a top fender and a bottom fender which are buckled fixedly from top to bottom; a plurality of rear battery pack connecting parts are arranged on one side of the bottom fender body, and a plurality of rear sub-frame connecting parts which are connected with the rear sub-frame assembly are constructed on the other side of the bottom fender body with respect to the rear battery pack connecting parts; and the rear battery pack connecting parts and the rear sub-frame connecting part are connecting holes which are formed in the bottom fender body.

Further, the top fender includes a straight middle connecting panel, and an upper left panel and an upper right panel which are fixedly connected to two ends of the middle connecting panel; the connecting holes are distributed in the upper left panel and the upper right panel, and one end of the upper left panel and one end of the upper right panel are in bifurcated forms; and a planar lifting contact part is formed on the bottom fender, with respect to the middle connecting panel.

Further, the bottom fender body is provided with a first edge which is linear and is located on one side of the rear battery pack connecting parts, and a second edge which is located on one side of the rear sub-frame connecting parts and extends to be connected with two ends of the first edge; the second edge is in an arc shape; the bottom fender at the second edge extends outwards with respect to the top fender; a flange is constructed on an overhang edge of the bottom fender; a plurality of drain holes are formed in the bottom fender; the flange (6013) located in the middle of the second edge (606) is provided with an up-dip bulged part; and a bulged dimension of the bulged part is reduced gradually from the middle to the two sides.

Further, the rear sub-frame assembly includes a rear sub-frame main body, and two positioning supports which are arranged close to left ends and right of the rear sub-frame main body respectively; body connecting parts and rear battery pack bottom fender connecting parts are constructed on the rear sub-frame main body; stabilization bar installation parts, upper control arm installation parts, and lower control arm installation parts are arranged on the rear sub-frame main body; and positioning parts which are matched with an external positioning element to locate the rear sub-frame main body are constructed on the two positioning supports.

Further, the rear sub-frame main body has a bilaterally symmetrical structure, and includes a rear sub-frame body located in the middle, and rear sub-frame cross beams and stabilization bar installation supports which are arranged on two opposite sides of the rear sub-frame body respectively; the rear sub-frame main body further includes lower supports which are connected between the rear sub-frame cross beams on two sides and the rear sub-frame body respectively; and the positioning supports at two ends are fixedly connected to the stabilization bar installation support on the corresponding end.

Furthermore, the rear subframe body is provided with a rear subframe front plate and a rear subframe rear plate which are fixedly connected together in a lapped way, the rear subframe cross beams on the two sides are both fixedly connected with the rear subframe front plate in a lapped way, and the lower supports on the two sides are fixedly connected between the rear subframe front plate and the rear subframe cross beams on the corresponding sides.

Further, an internal reinforcement panel is fixedly connected between the rear sub-frame front panel and the rear sub-frame rear panel, and a rear installation position support panel is fixedly connected to the rear sub-frame rear panel; the plurality of body connecting parts and the plurality of rear battery pack bottom fender connecting parts are bilaterally symmetrical on the rear sub-frame main body; and the stabilization bar installation parts, the upper control arm installation parts, and the lower control arm installation parts are bilaterally symmetrical on the rear sub-frame main body, which have two groups.

Further, a bottom surface of the front sub-frame assembly and the front battery pack bottom fender which are connected shows a gradually-lowered stair-step shape along the direction from the head to the tail of the vehicle; and a bottom surface of the rear battery pack bottom fender shows a down-dip shape form along the direction from the head to the tail of the vehicle.

Compared with the prior art, the present disclosure has the following advantages:

According to the chassis collision structure of the new energy vehicle of the present disclosure, the front lower collision beam assembly, the front sub-frame assembly, the front battery pack bottom fender, the rear battery pack bottom fender, and the rear sub-frame assembly are arranged sequentially along the length direction of the vehicle, the front lower collision beam assembly, the front sub-frame assembly, and the front battery pack bottom fender are connected together, the rear battery pack bottom fender is connected with the rear sub-frame assembly together, and the connecting parts which are connected with the battery pack are arranged on the front battery pack bottom fender and the rear battery pack bottom fender respectively; and an collision system which is located at the vehicle chassis may be formed based on the above structures in combination with the battery pack connected therewith, and thus, the deformation of the chassis structure may be guided to caused or increased in specific areas through the structural design of each part, thereby improving the collision performance of the chassis of the new energy vehicle.

The above description is only the overview of the technical solutions of the present disclosure, implementation may be performed according to the content of the specification in order to more clearly understand the technical means of the present disclosure, and specific embodiments of the present disclosure are listed below in order to make the above and other objectives, features and advantages of the present disclosure more obvious and understandable.

BRIEF DESCRIPTION OF THE DRAWINGS

Accompanying drawings constituting a part of the present disclosure are used for further understanding the present disclosure, and schematic embodiments of the present disclosure and their description are used for explaining the present disclosure instead of improperly limiting it. In the drawings.

BRIEF DESCRIPTION OF REFERENCES OF THE DRAWINGS

Figure 1:
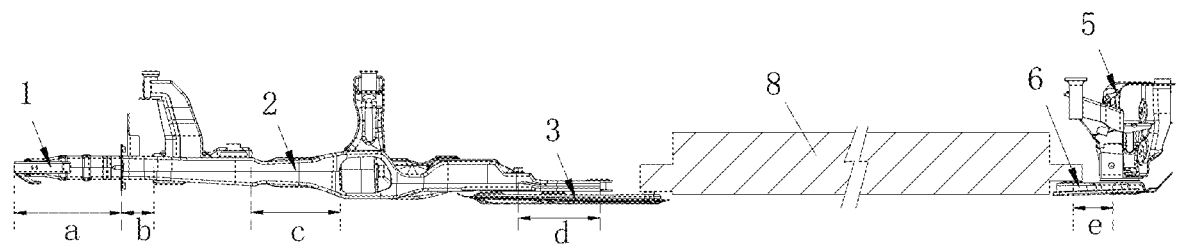
FIG. 1 is an overall schematic diagram illustrating the chassis collision structure of a new energy vehicle in the embodiments of the present disclosure.

1—Front lower collision beam assembly, 2—Front sub-frame assembly, 3—Front battery pack bottom fender, 4—Front battery pack connecting part, 5—Rear sub-frame assembly, 6—Rear battery pack bottom fender, 7—Rear battery pack connecting part, 8—Battery pack, and 9—Lower floor assembly;

101—Front lower collision beam, 102—Energy-absorbing box, 103—sub-frame connecting panel, and 104—Reinforcement panel;

201—Longitudinal beam of sub-frame, 202—Front cross beam of sub-frame, 203—Rear cross beam of sub-frame, 204—Energy-absorbing box connecting panel, 205—Front connecting part of body, 206—Front installation position support, 207—Front mounting support, 208—Middle installation position support, 209—Powertrain front mounting installation part, 2010—Powertrain rear mounting installation part, 2011—Battery pack bottom fender installation position, 2012—Middle connecting part of body, 2013—Steering gear installation position, 2014—Stabilization bar installation position, 2015—Large bushing installation position of swing arm, 2016—Rear connecting part of body, 2017—Small bushing installation position of swing arm, 2018—Powertrain front mounting, 2019—Powertrain rear mounting, 2020—Collapsing rib, 2021—Deformation guide port, 2022—Via-hole drive pipe, and 2061—Front installation drive pipe;

20101—Longitudinal beam upper panel, 20102—Longitudinal beam lower panel, 20201—Upper panel of front cross beam, 20202—Lower panel of front cross beam, 20203—Inclined plane of front cross beam, 20301—Upper panel of rear cross beam, 20302—Lower panel of rear cross beam, 20303—Curb stone entry part, 20304—Upper inclined plane of rear cross beam, 20305—Lower inclined plane of rear cross beam, 20306—Front battery pack fender connecting part, 20307—Lifting contact part, 20901—Front cross beam installation position, 20902—Longitudinal beam installation position, 20151—First large bushing installation point, and 20152—Second large bushing installation point;

501—Support pipe of body front installation position, 502—Stabilization bar installing support, 503—Rear sub-frame cross beam, 504—Front panel of rear sub-frame, 505—Support pipe of body rear installation position, 506—Rear panel of rear sub-frame, 507—Threaded pipe of stabilization bar installation position, 508—Primary positioning support, 509—Threaded pipe of installation position outside fender, 5010—Lower support, 5011—Welded nut of installation position inside fender, 5012—Internal reinforcement panel, 5013—Rear installation position support panel, 50131—Second through hole, 5014—Welded nut of stabilization bar installation position, 5015—Auxiliary positioning support, 5016—Upper control arm installation position of front panel, 5017—Lower control arm installation position of front panel, 5018—Upper control arm installation position of rear panel, 5019—Lower control arm installation position of rear panel, and 5021—Run-through hole;

601—Bottom fender, 602—Top fender, 603—Battery pack connecting hole, 604—Rear sub-frame connecting hole, 605—First edge, 606—Second edge, 607—Support pipe, 6011—Bottom fender bulge, 6012—Reinforcing rib, 6013—Flange, 6014—Bulged part, 6015—Drain hole, 6016—Lifting contact part, 6021—Middle connecting panel, 6022—Upper left panel, 6023—Upper right panel, and 6024—Upper fender bulge.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompany drawings in the embodiments of the present disclosure. Obviously, the descried embodiments are part, not all of the embodiments of the present disclosure. Based on the embodiments in the present disclosure, all other embodiments obtained by those ordinarily skilled in the art without involving creative labor belong to the protection scope of the present disclosure.

It should be noted that the embodiments in the present disclosure and features in the embodiments may be mutually combined without conflicts.

The present disclosure may be illustrated in details below with reference to the drawings and the embodiments.

The embodiment relates to a chassis collision structure of a new energy vehicle, as shown in the FIG. 1, which includes a front lower collision beam assembly 1, a front sub-frame assembly 2, a front battery pack bottom fender 3, a rear battery pack bottom fender 6, and a rear sub-frame assembly 5 which are arranged sequentially along a direction from a head to a tail of a vehicle.

The front lower collision beam assembly 1 is connected to a front end of the front sub-frame assembly 2; the front battery pack bottom fender 3 is connected to a bottom of the front sub-frame assembly 2; the rear battery pack bottom fender 6 is connected to a bottom of the rear sub-frame assembly 5; connecting parts which are connected with a battery pack 8 are arranged at one end of the front battery pack bottom fender 3 and one end of the rear battery pack bottom fender 6, which are close to each other, respectively; and the connecting parts are front battery pack connecting parts 4 and rear battery pack connecting parts 7, respectively.

As a preferred embodiment, connections between the front lower collision beam assembly 1 and the front sub-frame assembly 2, between the front sub-frame assembly 2 and the front battery pack bottom fender 3, between the rear battery pack bottom fender 6 and the rear sub-frame assembly 5, between the front battery pack bottom fender 3 and a battery pack 8, and between the rear battery pack bottom fender 6 and the battery pack 8 may be achieved by a bolt structure.

Figure 2:
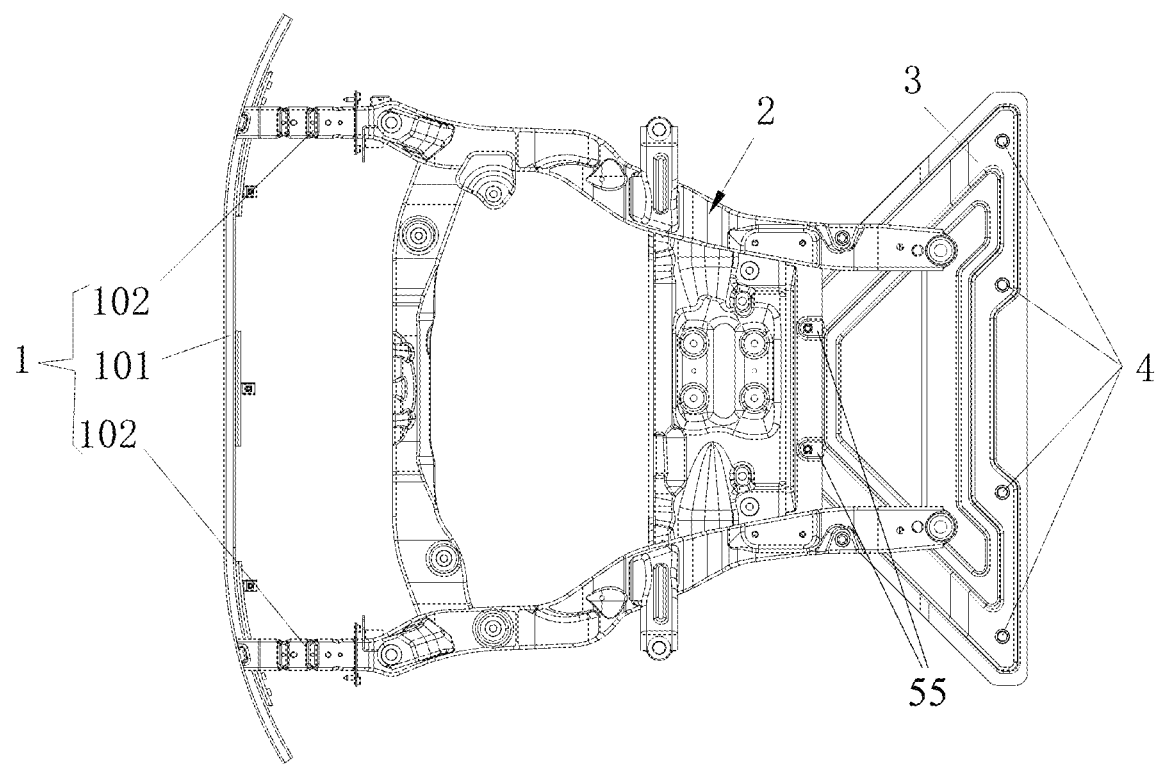
FIG. 2 is a structural schematic diagram illustrating a front end of the collision structure in the embodiments of the present disclosure.
Figure 3:
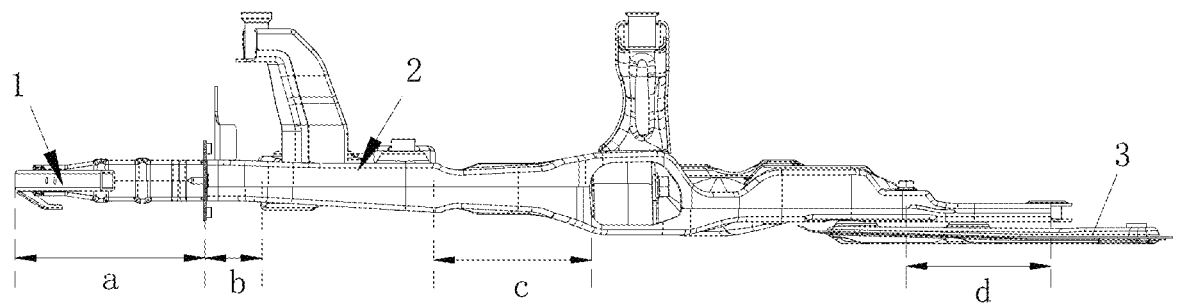
FIG. 3 is a schematic diagram illustrating a distribution of a collapsing deformation interval of a front end of the collision structure in the embodiments of the present disclosure.
Figure 4:
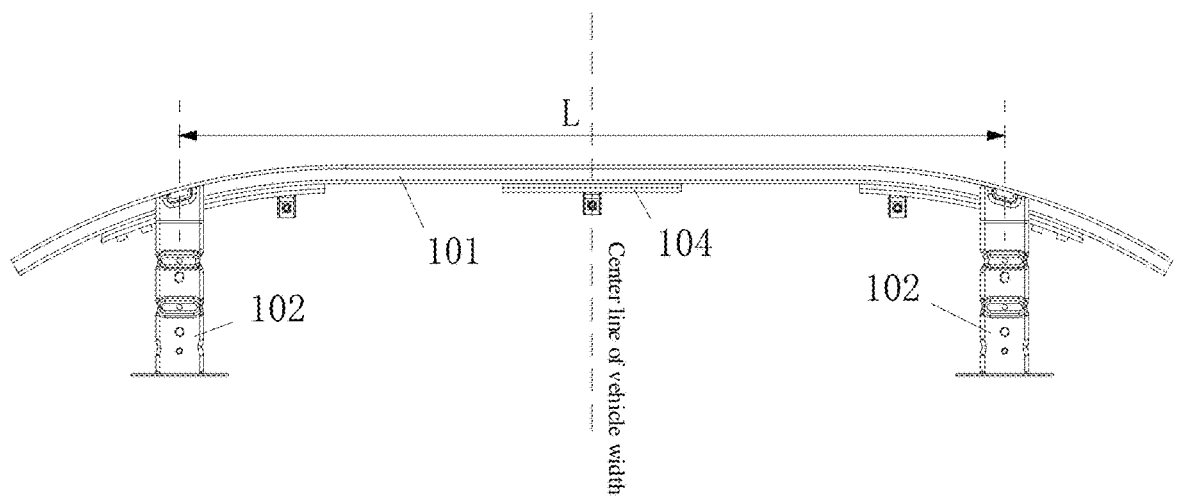
FIG. 4 is a structural schematic diagram illustrating the front lower collision beam assembly in the embodiments of the present disclosure.

With reference to FIGS. 2 to 4, the front lower collision beam assembly 1 specifically includes energy-absorbing boxes 102 which are arranged on two sides, and a front lower collision beam 101 which is connected with the energy-absorbing boxes 102 on the two sides. The energy-absorbing boxes 102 on the two sides are connected with the front sub-frame assembly 2 by a sub-frame connecting panel 103 located at one end of each energy-absorbing box, and are particularly connected with energy-absorbing box connecting panels 204 by the bolt structure. The front lower collision beam 101 is connected with the energy-absorbing boxes 102 on the two sides in a welded mode; and in addition to the welding mode, the front lower collision beam may also be connected with the energy-absorbing boxes by bolted connection, and other means.

Figure 5:
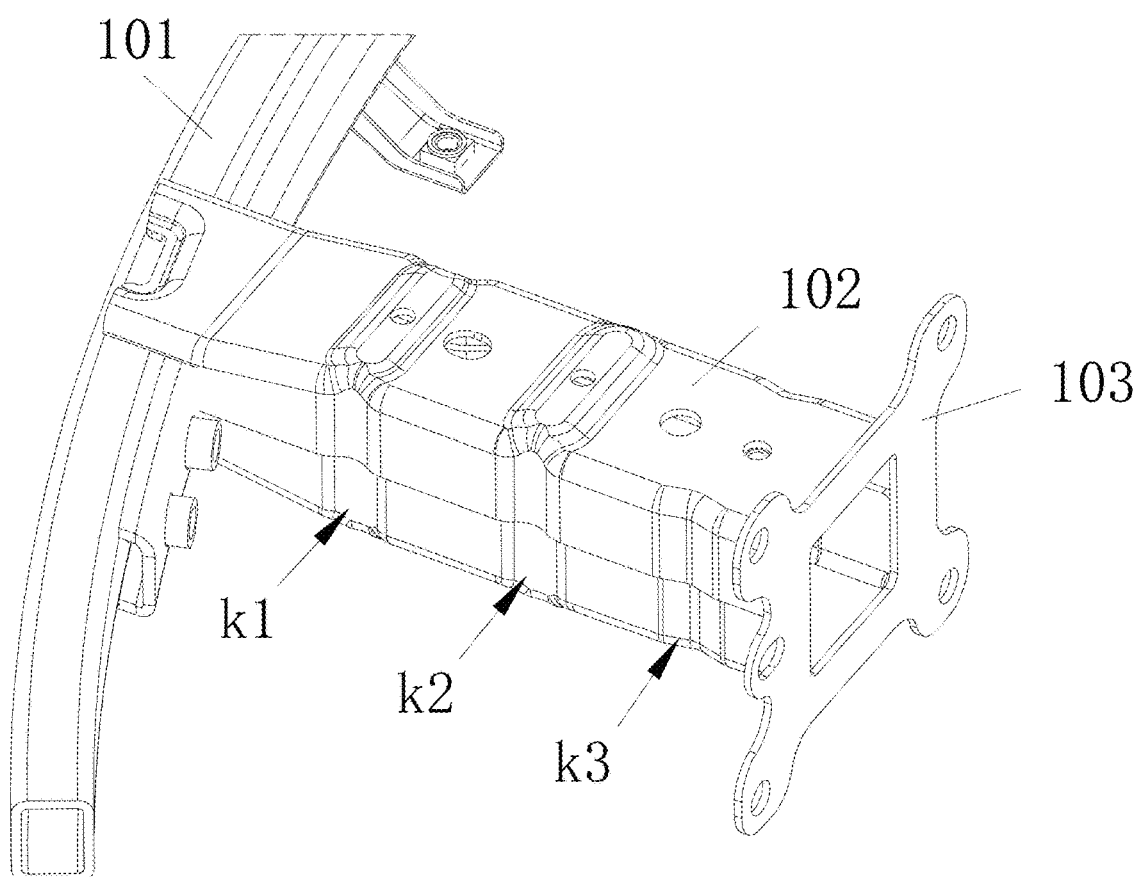
FIG. 5 is a structural schematic diagram illustrating the energy-absorbing box in the embodiments of the present disclosure.

In the embodiment, as shown in the FIG. 5, a plurality of collapsing parts k1, k2, and k3 are arranged at intervals on each energy-absorbing box 102 along a length direction of each energy-absorbing box; and each collapsing part may, for example, consist of bulges formed at an upper end face and a lower end face of each energy-absorbing box 102, and pits formed at a left end face and a right end face of each energy-absorbing box 102 corresponding to the position of the bulges. Of course, in addition to a mode of bulging at the upper end and the lower end and recessing on both sides, collapsing holes, and other existing collapsing forms may also be used for the collapsing parts on the energy-absorbing boxes 102.

In the embodiment, in order to improve the collision performance of the front lower collision beam assembly 1, and particularly, meet the performance of 25% frontal collision of the vehicle, a length L of the front lower collision beam 101, which is located between centers of the energy-absorbing boxes 102 on the two sides, is larger than 50% of an overall width of the vehicle. As an preferred exemplary form, as shown in FIG. 4, the front lower collision beam 101 includes a linear segment located in the middle, and arc segments which are located at two ends of the linear segment; the arc segments at two ends bend towards one side of each energy-absorbing box 102, that is, one side of the tail of the vehicle, with a bending radian matched with a bumper on the head of the vehicle; and meanwhile, widths outside bending parts of the front lower collision beam 101 should also fall within the range of action of a "pendulum test" during design.

In order to ensure the structural strength of the front lower collision beam 101, in the embodiments, preferably, a section of the front lower collision beam 101 is designed as a square shape or a rectangle shape, for example, the front lower collision beam 101 may be formed by directly bending square steel. In addition, in order to the improve the stiffness of the front lower collision beam 101 during the frontal collision of the vehicle, in the embodiments, a reinforcement panel 104 which is fixedly connected to one side of the front lower collision beam 101 may also be arranged in the middle of the front lower collision beam 101 in the length direction. The reinforcement panel 104 has an extension length along the length direction of the front lower collision beam 101, which may, for example, be arranged on an inner side, which faces towards the front sub-frame assembly 2, of the front lower collision beam 101.

Figure 6:
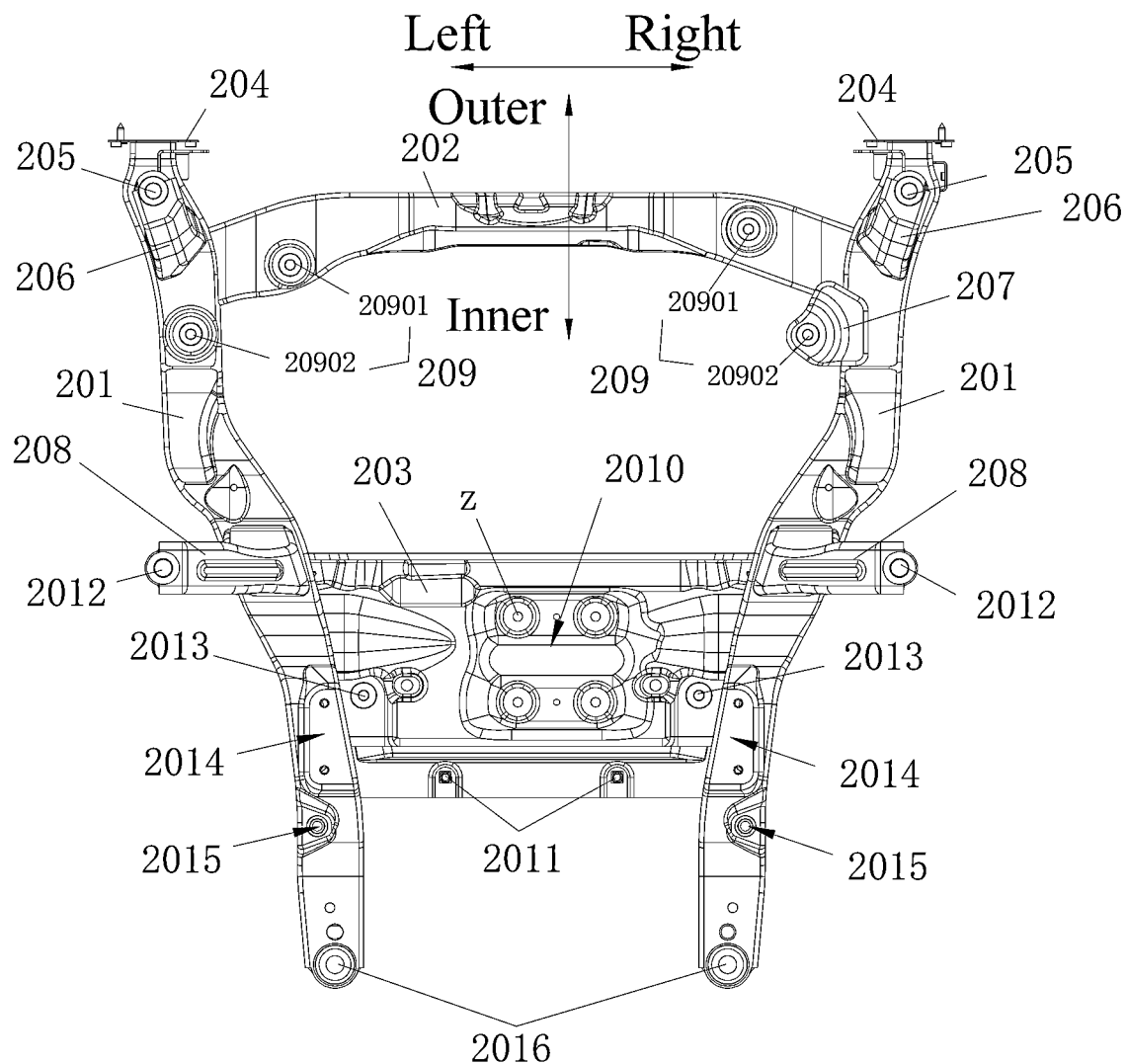
FIG. 6 is a structural schematic diagram illustrating the front sub-frame assembly in the embodiments of the present disclosure.
Figure 7:
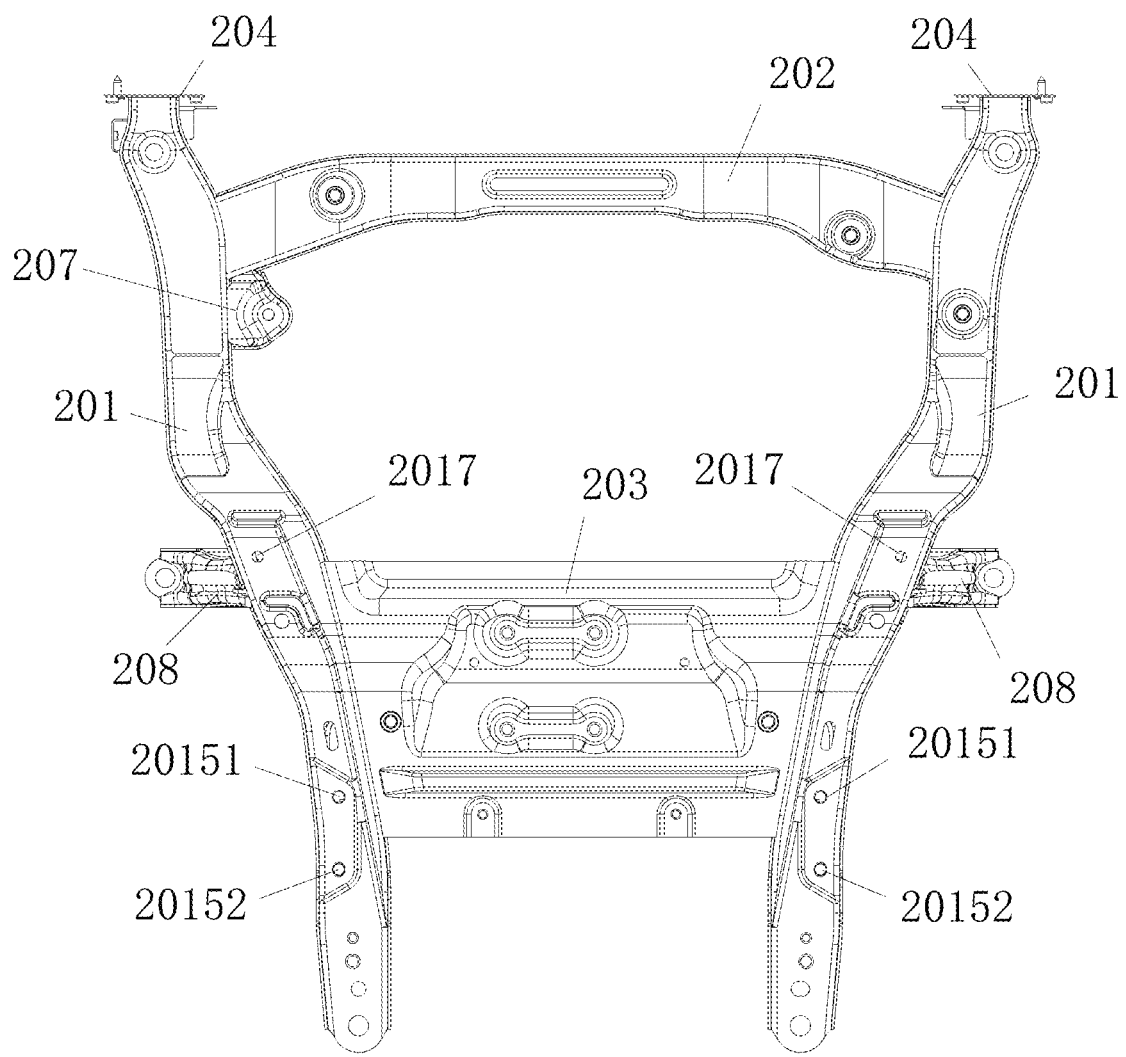
FIG. 7 is a structural schematic diagram illustrating a back structure in FIG. 6.

As shown in the FIGS. 6 and 7, in the embodiments, the front sub-frame assembly 2 includes two longitudinal beams 201 of sub-frame, which are arranged on two sides, a front cross beam 202 of sub-frame, which is connected between the longitudinal beams 201 of sub-frame and is close to a front end of the longitudinal beams 201 of sub-frame, and a rear cross beam 203 of sub-frame, which is close to a rear end of the longitudinal beams 201 of sub-frame with respect to the front cross beam 202 of sub-frame; and front connecting parts 205 of body, middle connecting parts 2012 of body, and rear connecting parts 2016 of body which are opposite to each other are arranged on the longitudinal beams 201 of sub-frame on the two sides along the length direction of the longitudinal beams 201 of sub-frame.

Meanwhile, the front sub-frame assembly 2 further includes two powertrain front mounting installation parts 209 which are arranged on the two sides oppositely, and a powertrain rear mounting installation part 2010 which is arranged on the rear cross beam 203 of sub-frame. Wherein the powertrain front mounting installation part 209 on each side is arranged close to a junction of the front cross beam 202 of sub-frame and the longitudinal beam 201 of sub-frame on the side, and is provided with a front cross beam installation position 20901 arranged at the front cross beam 202 of sub-frame, and a longitudinal beam installation position 20902 arranged at the longitudinal beams 201 of sub-frame. The powertrain rear mounting installation part 2010 is located in the middle of the rear cross beam 203 of sub-frame in the length direction.

In the embodiment, in terms of a motor in a cabin of the new energy vehicle, which is arranged on a left side, during design, a front mounting support 207 which extends towards an inner side of the longitudinal beam 201 of sub-frame is fixedly connected to the longitudinal beam 201 of sub-frame on one side, that is, a right side, shown in FIG. 6, in order to improve the utilization rate of longitudinal beam materials, and the longitudinal beam installation position 20902 of the longitudinal beam 201 of sub-frame on the side is arranged on the front mounting support 207. In addition, with reference to FIG. 8, in the embodiments, the front cross beam installation positions 20901 and the longitudinal beam installation positions 20902 may be arranged fixedly by threaded pipes. Of course, in addition to the threaded pipes, other installation structures, such as connecting holes, are also available.

In the embodiment, the powertrain rear mounting installation part 2010 on the rear cross beam 203 of sub-frame is provided with a plurality of rear cross beam installation positions z which are distributed on the rear cross beam 203 of sub-frame regularly, wherein the four rear cross beam installation positions z are distributed in a square shape, as shown in the FIG. 6; and during design, the connecting holes which run through the rear cross beam 203 of sub-frame may be used as the rear cross beam installation positions z. Meanwhile, in order to ensure the structural strength of rear cross beam installation positions z, a support pipe may be arranged in the rear cross beam 203 of sub-frame with respect to each connecting hole, which is fixedly welded in the rear cross beam 203 of sub-frame.

Figure 9:
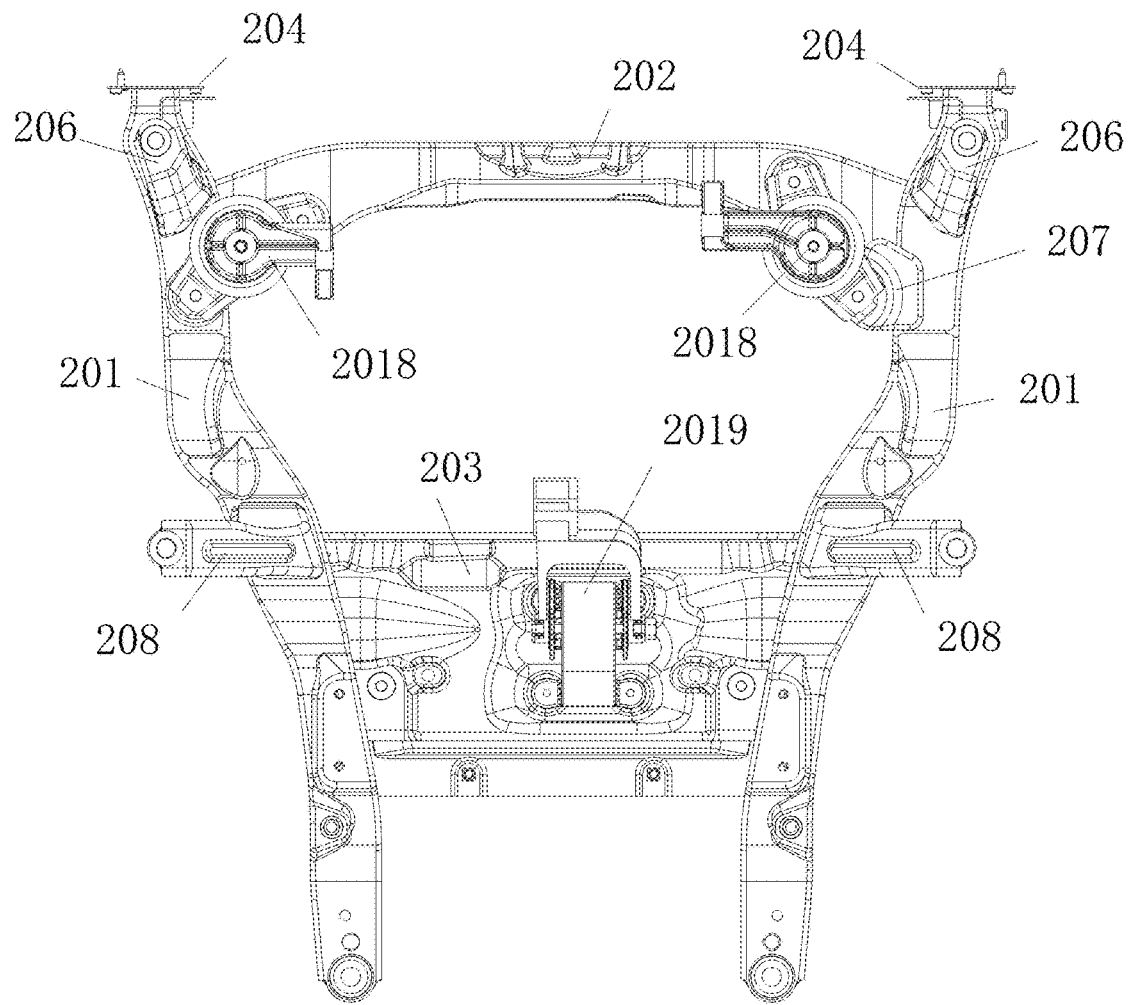
FIG. 9 is an assembly state diagram illustrating front and rear powertrain mountings.

As shown in the FIG. 9, from the assembled state of powertrain front mountings 2018 and powertrain rear mountings 2019 on the front sub-frame assembly 2, it can be seen that two powertrain front mountings 2018 are assembled on the front sub-frame assembly 2 along a height direction of the front sub-frame assembly 2, that is, a Z direction of the vehicle, by the front cross beam installation positions 20901 and the longitudinal beam installation positions 20902 in the two powertrain front mounting installation parts 209. Therefore, it is conducive to reduction in the occupation of cabin space along the overall length direction of the vehicle, thereby facilitating the assembly of components.

In the embodiment, energy-absorbing box connecting panels 204 are fixedly connected to front ends of the longitudinal beams 201 of sub-frame on the two sides respectively, by which the energy-absorbing boxes 102 in the front lower collision beam assembly 1 are in bolted connection with the longitudinal beams 201 of sub-frame. In the embodiments, a front installation position support 206 is fixedly connected to the front end of the longitudinal beams 201 of sub-frame, and a middle installation position support 208 is also fixedly connected to the middle of the longitudinal beams 201 of sub-frame.

At this moment, the front connecting parts 205 of body are arranged on the front installation position supports 206, the middle connecting parts 2012 of body are arranged on the middle installation position supports 208, and the rear connecting parts 2016 of body are directly arranged at rear ends of the longitudinal beams 201 of sub-frame.

Figure 8:
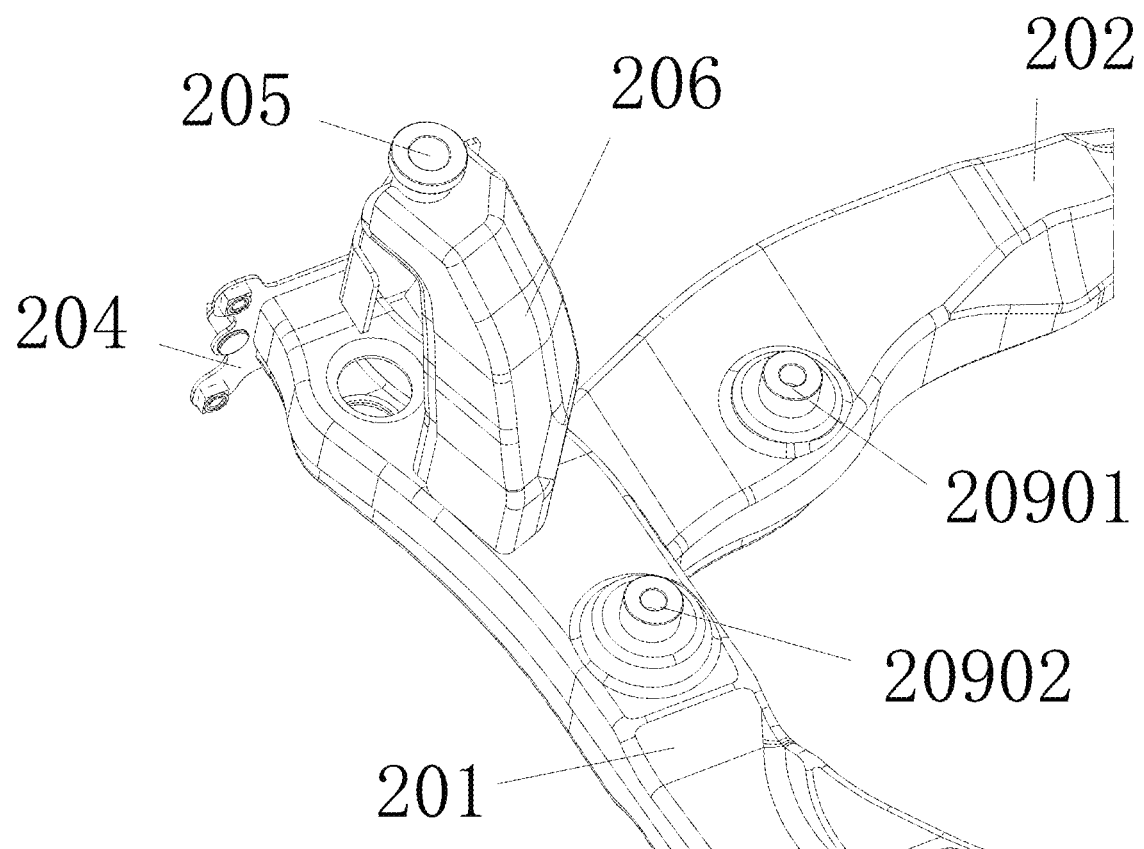
FIG. 8 is a structural schematic diagram illustrating a front installation position support on a left side in FIG. 6.

With reference to FIG. 8, each front installation position support 206 may consist of inner and outer panels which are buckled fixedly, and each front connecting part 205 of body, which is located thereon, may have a support pipe structure which is fixedly connected to the top of each front installation position support 206. Meanwhile, it should be noted that preferably, the front installation position supports 206 and the powertrain front mounting installation part 209 on the same side keep as close as possible during arrangement on the basis of ensuring the structural performance of the powertrain front mounting installation parts 209 and the front connecting parts 205 of body, so that the dynamic stiffness of the front mountings is strengthened by increasing local dimensions to a maximum extent in case that the space is available.

Preferably, in terms of construction, each middle installation position support 208 may also consist of the inner and the outer panels which are buckled fixedly, which is the same as the front installation position supports 206, and the middle connecting parts 2012 of body, which are located thereon, may also have support pipe structures which are fixedly welded on tops of the middle installation position supports 208. The rear connecting parts 2016 of body, which are directly arranged on ends of the longitudinal beams 201 of sub-frame, also have the support pipe structures which are fixedly welded in the longitudinal beams 201 of sub-frame.

In the embodiment, stabilization bar installation positions 2014, large bushing installation positions 2015 of swing arms, and small bushing installation positions 2017 of swing arms which are opposite to each other are arranged on the longitudinal beams 201 of sub-frame on the two sides. Meanwhile, steering gear installation positions 2013 are also arranged on the rear cross beam 203 of sub-frame, installation positions 2011 of front battery pack bottom fender, at which the battery pack fenders are connected, are arranged on one side of the rear cross beam 203 of sub-frame, which is back on to the front cross beam 202 of sub-frame.

Wherein, the stabilization bar installation positions 2014, the large bushing installation positions 2015 of swing arms, and the small bushing installation positions 2017 of swing arms may be installation holes which are formed in the longitudinal beams 201 of sub-frame; and installation supports may be arranged additionally inside the longitudinal beams 201 of sub-frame with respect to swing arm bushing installation points to ensure the stability of swing arm bushings in installation.

Figure 10:
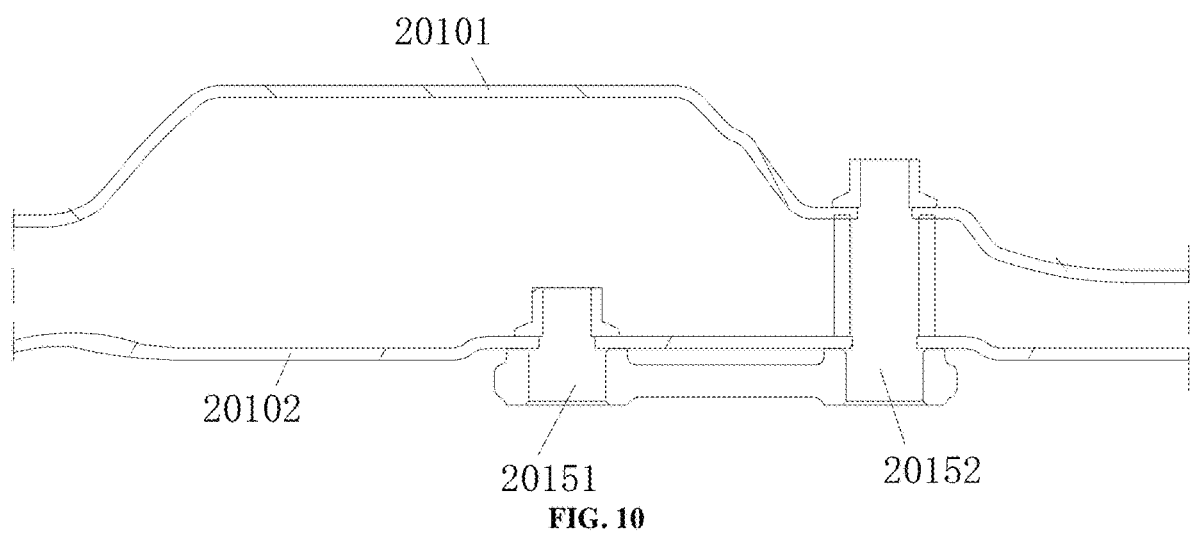
FIG. 10 is a structural schematic diagram illustrating the large bushing installation position of swing arm in the embodiments of the present disclosure.

In addition, in the embodiment the large bushing installation positions 2015 of swing arms are colinear with the stabilization bar installation positions 2014 along the length direction of the longitudinal beams 201 of sub-frame, and the stabilization bar installation positions 2014 are located on a top of the longitudinal beams 201 of sub-frame; and the large bushing installation positions 2015 of swing arms are provided with first large bushing installation points 20151 and second large bushing installation points 20152 which are arranged at intervals along the length direction of the longitudinal beams 201 of the sub-frame. With reference to FIG. 10, the first large bushing installation points 20151 are close to the stabilization bar installation positions 2014 and only run through bottoms of the longitudinal beams 201 of sub-frame, that is, longitudinal beam lower panels 20102 of the longitudinal beams 201 of sub-frame; and the second large bushing installation positions 20152 run through the longitudinal beams 201 of sub-frame from top to bottom, that is, they run through longitudinal beam upper panels 20101 and the longitudinal beam lower panels 20102.

Figure 11:
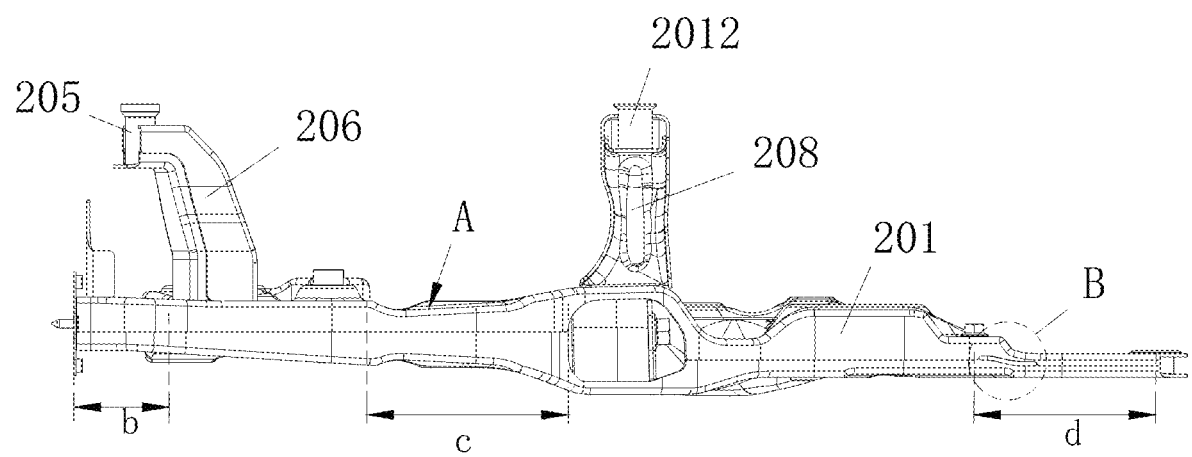
FIG. 11 is a schematic diagram illustrating an arrangement of a collapsing deformation interval of the front sub-frame assembly in the embodiments of the present disclosure.
Figure 12:
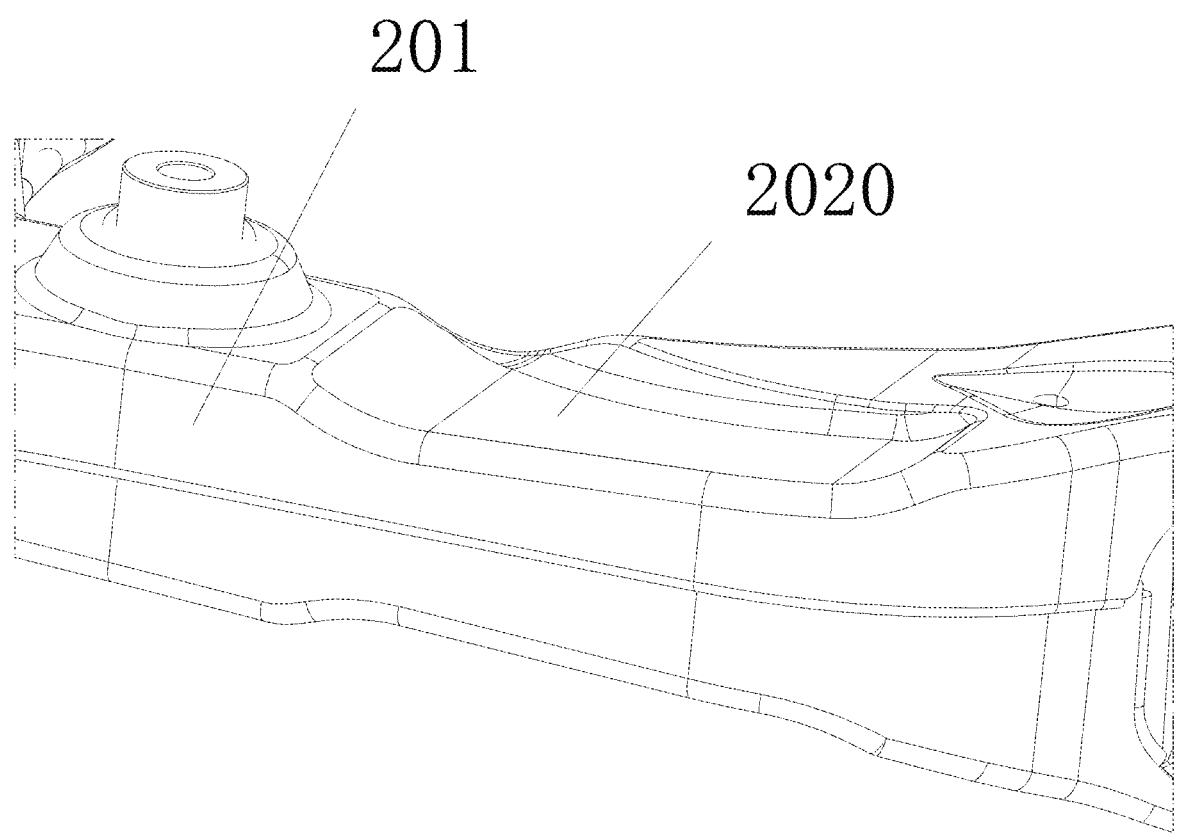
FIG. 12 is a partial enlarged drawing of A in FIG. 11.
Figure 13:
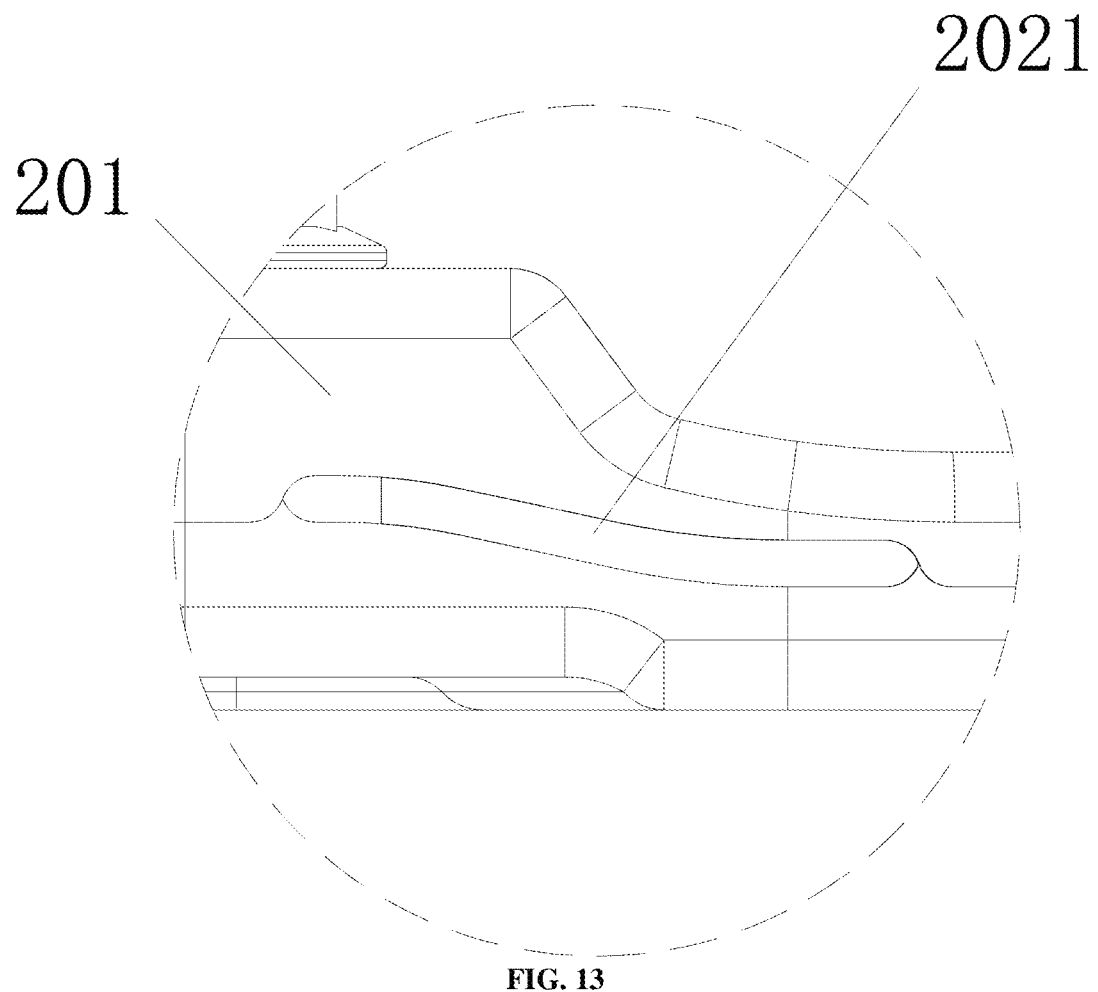
FIG. 13 is a partial enlarged drawing of B in FIG. 11.

The stabilization bar installation positions 2014 and the large bushing installation positions 2015 of swing arms are arranged at relative positions, which may facilitate the assembly of stabilization bars and large bushings of swing arms on the sub-frame assembly. In addition, for the purpose of improving the collision energy absorption performance of the longitudinal beams 201 of sub-frame in the sub-frame assembly, as shown in the FIGS. 11 to 13 of the embodiments, a plurality of collapsing deformation intervals arranged along the length direction of the longitudinal beams 201 of sub-frame are arranged on the longitudinal beams 201 of sub-frame respectively.

Wherein, in the specific design, the collapsing deformation intervals have front intervals b located on front ends of the longitudinal beams 201 of sub-frame, middle intervals c close to the middle of the longitudinal beams 201 of sub-frame, and rear intervals d located on rear ends of the longitudinal beams 201 of sub-frame. The length of each interval may be selected based on the overall structural design of the longitudinal beams, the stiffness of the position of the powertrain front mounting installation parts 209, and the collision performance design of the vehicle, and generally, collapsing ribs 2020 are arranged on the longitudinal beams 201 of sub-frame at the middle intervals c, and strip deformation guide ports 2021 are formed in the longitudinal beams 201 of sub-frame at the rear intervals d to ensure the collapsing energy absorption effect of the longitudinal beams 201 of sub-frame.

Figure 14:
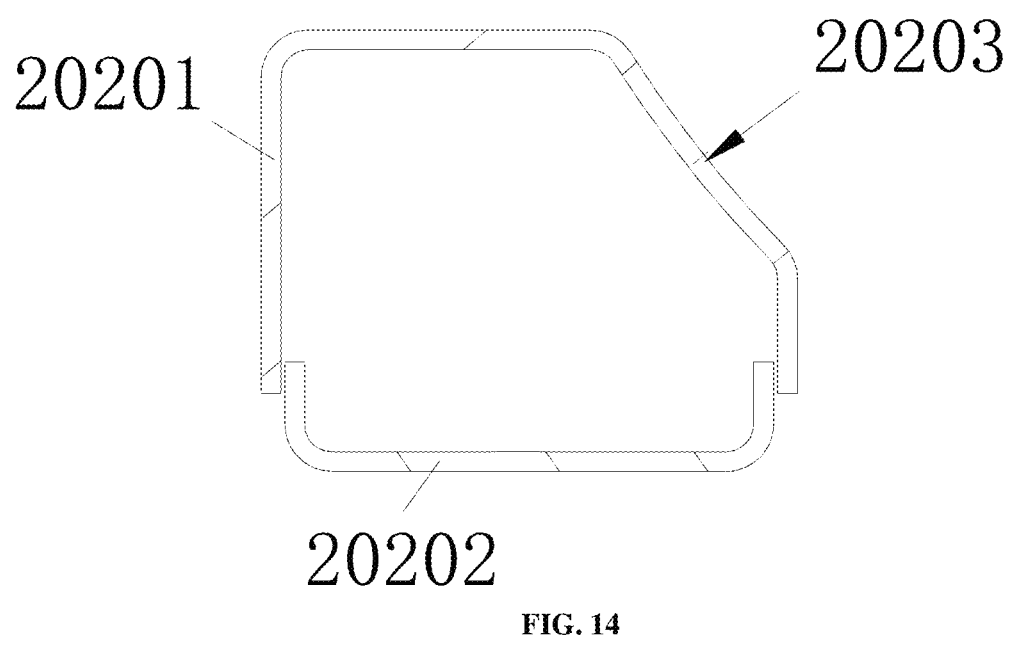
FIG. 14 is a structural schematic diagram illustrating the front cross beam of sub-frame in the embodiments of the present disclosure.
Figure 15:
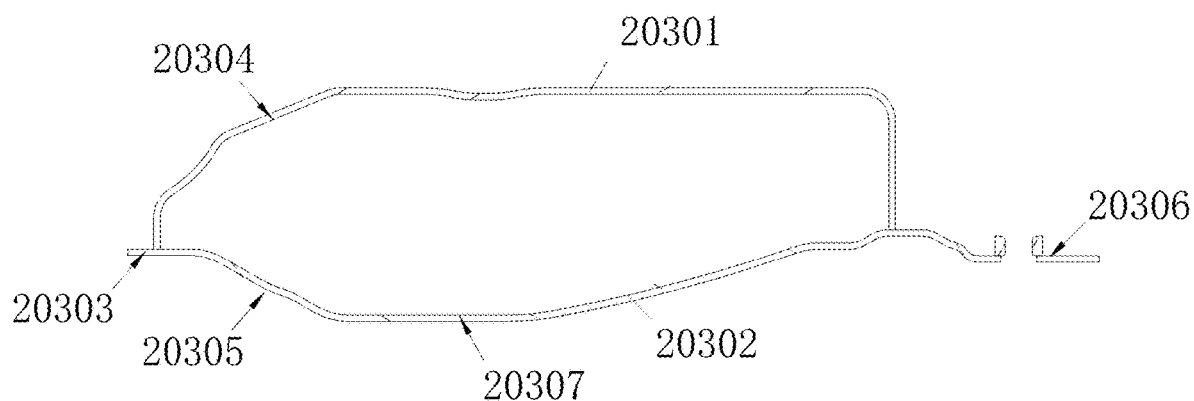
FIG. 15 is a structural schematic diagram illustrating the rear cross beam of sub-frame in the embodiments of the present disclosure.

As mentioned above, the longitudinal beams 201 of sub-frame consist of the longitudinal beam upper panels 20101 and the longitudinal beam lower panels 20102 which are buckled fixedly. In the embodiments, the front cross beam 202 of sub-frame and the rear cross beam 203 of sub-frame consist of two sheet metals which are buckled, respectively, which are the same as most of the cross beams and the longitudinal beams in the existing vehicle. With reference to FIGS. 14 and 15, the front cross beam 202 of sub-frame consists of an upper panel 20201 of front cross beam and a lower panel 20202 of front cross beam; and the rear cross beam 203 of sub-frame consists of an upper panel 20301 of rear cross beam and a lower panel 20302 of rear cross beam.

Combined with the constitute of the above cross beam structure, in the embodiment, in order to reduce an influence on the collapsing deformation of the longitudinal beams 201 of sub-frame by sliding a powertrain upwards during the collision, an inclined plane 20203 of front cross beam, which inclines towards an outside of the front cross beam 202 of sub-frame, is formed on an upper part of one side of the front cross beam 202 of sub-frame, which directly faces the rear cross beam 203 of sub-frame, and an upper inclined plane 20304 of rear cross beam, which inclines towards an outside of the rear cross beam 203 of sub-frame, is also arranged on an upper part of one side of the rear cross beam 203 of sub-frame, which directly faces the front cross beam 202 of sub-frame. The inclined plane 20203 of front cross beam and the upper inclined plane 20304 of rear cross beam constitute a guide surface, where the powertrain may slide upwards.

Further, in the embodiment, a curb stone entry part 20303 which extends outwards is also arranged on one side of the rear cross beam 203 of sub-frame, which directly faces the front cross beam 202 of sub-frame; the upper inclined plane 20304 of rear cross beam is located at a top of the rear cross beam 203 of sub-frame, which is connected with the curb stone entry part 20303, and a lower inclined plane 20305 of rear cross beam, which inclines backwards, is a bottom of the rear cross beam 203 of sub-frame, which is connected with the curb stone entry part 20303. In addition, a planar lifting contact part 20307 is arranged at the bottom of the rear cross beam 203 of sub-frame, and a front battery pack fender connecting part 20306 which extends outwards is also arranged on one side of the rear cross beam 203 of sub-frame, which is back on to the front cross beam 202 of sub-frame.

The front battery pack fender connecting part 20306 and the curb stone entry part 20303 are in plate shapes, both of which are specifically formed by extending the lower panel 20302 of rear cross beam outwards on the corresponding side; the front battery pack bottom fender installation positions 2011 are arranged on the front battery pack fender connecting part 20306; and generally, the front battery pack bottom fender installation positions 2011 are installation holes formed in the front battery pack fender connecting part 20306. In addition, an included angle between the lower inclined plane 20305 of rear cross beam and a horizontal plane is, generally, designed as 40° to 60°, and an included angle between the inclined plane 20203 of front cross beam and the horizontal plane and an included angle between the upper inclined plane 20304 of rear cross beam and the horizontal plane are selected based on specific cases.

In the embodiment, the vehicle may pass through a curb stone by means of a ground clearance of the curb stone entry part 20303 by the design of the curb stone entry part 20303, and may drive across the curb stone under special conditions in combination with the arrangement of the lower inclined plane 20305 of rear cross beam at a rear of the curb stone entry part, thereby reducing damages arising from bumping against the curb stone, and other structures. The lifting contact part 20307 is specifically a plane which is formed on the bottom of the rear cross beam 203 of sub-frame, where the sub-frame assembly may be lifted during maintenance; and an area of the lifting contact part 20307 may depend on an overall structure of the rear cross beam 203 of sub-frame and a fit between components to perform specific selection.

In the embodiments, the sub-frame assembly 2 may be combined with the installed powertrain to improve the overall structural stability by the three-point arrangement of the powertrain front mounting installation parts and the powertrain rear mounting installation part; and the mounting stiffness is improved by the higher stiffness of the front cross beam 202 of sub-frame and the longitudinal beams 201 of sub-frame based on the arrangement that the powertrain front mounting installation parts 209 are close to the junction of the front cross beam 202 of sub-frame and the longitudinal beams 201 of sub-frame, and are provided with installation positions which are located on the front cross beam and the longitudinal beams respectively, thereby ensuring the mounting stiffness on the front sub-frame.

Meanwhile, the front sub-frame assembly 2 may meet requirements of different safety collision conditions, such as 56FF, MODB, ODB, FP, and RCAR etc., in combination with designs of the collapsing deformation intervals on the longitudinal beams 201 of sub-frame, the inclined plane 20203 of front cross beam, and the upper inclined plane 20304 of rear cross beam.

Figure 16:
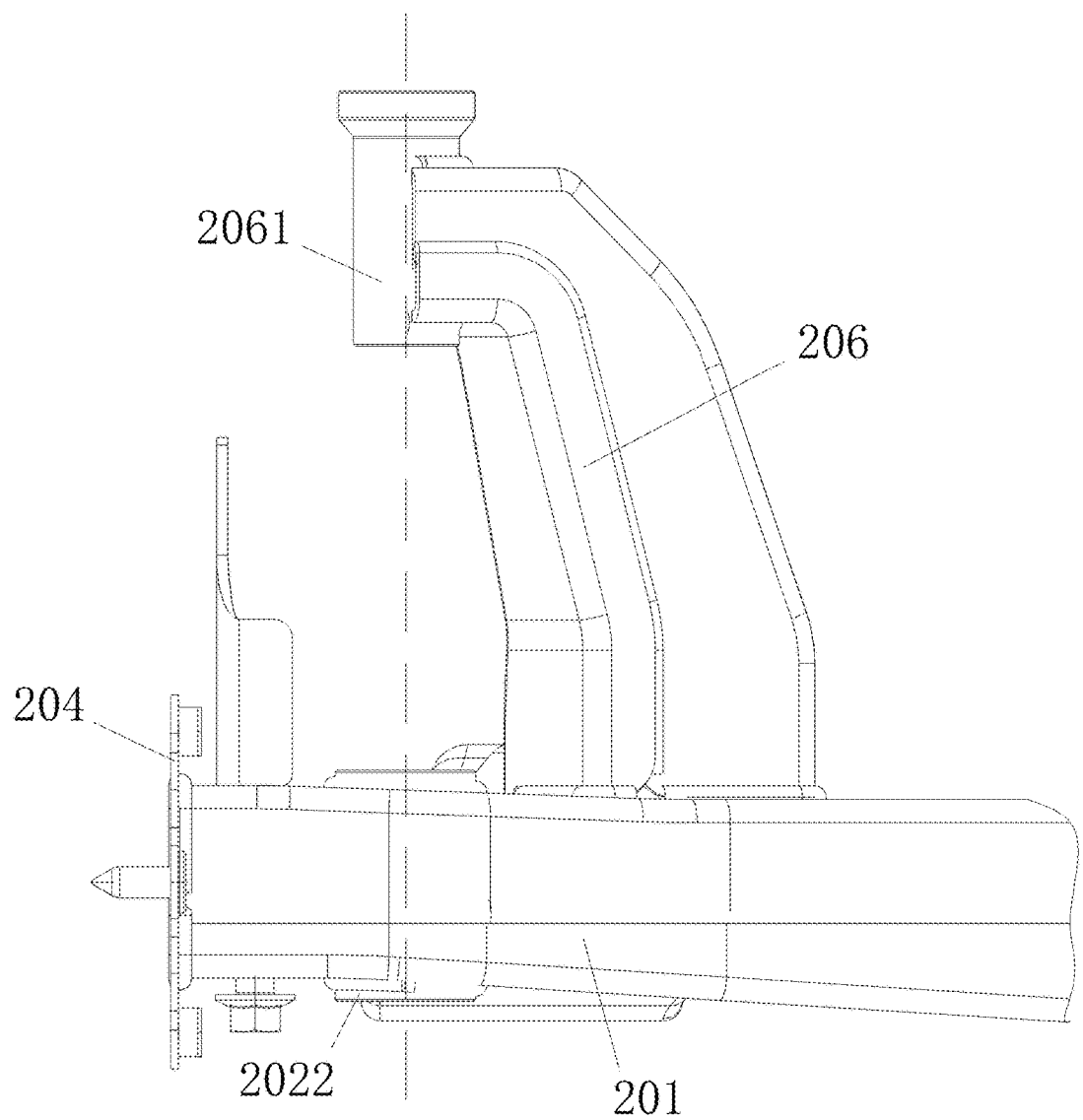
FIG. 16 is a schematic diagram illustrating an arrangement of the front installation drive pipe and the tool pass-through part in the embodiments of the present disclosure.

In addition, particularly, in the embodiment, for the front connecting parts 205 of body, for ease of operation during the connection of the front sub-frame and the body, also as shown in FIG. 16, the front installation drive pipes 2061 arranged on the front installation position supports 206 are used as the front connecting parts 205 of body, which have installation drive pipe structures; and the front installation drive pipes 2061 are located right above of the corresponding front longitudinal beams 201 of sub-frame, which are over against the front installation drive pipes 2061; and tool pass-through parts for external installation tools to pass through are arranged on the corresponding front longitudinal beams 201 of sub-frame.

The external installation tools through which the tool pass-through parts pass are tools for connecting the front connecting parts 205 of body with the body; and as the connection is completed with a bolt structure, the external installation tools, for example, may be sleeve tools with extension rods. Meanwhile, the tool pass-through parts located on the longitudinal beams 201 of sub-frame may, generally, be via-through drive pipes 2022 which are arranged on the longitudinal beams 201 of sub-frame; and the via-through drive pipes 2022 run through two ends of upper end and lower end of the longitudinal beams 201 of sub-frame, and are fixed on the longitudinal beams 201 of sub-frame by welding. In the embodiments, the front battery pack bottom fender 3 may protect a front end of the battery pack 8; at this moment, with reference to FIG. 2, the front battery pack bottom fender 3, as an exemplary structural form, in the embodiment shows a triangular shape; a front sub-frame connecting part 55 which is connected with the front sub-frame assembly 2 is arranged close to a vertex angle of the front battery pack bottom fender 3; and the front battery pack connecting parts 4 which are connected with the battery pack 8 are arranged on an edge of the front battery pack bottom fender 3, which directly faces the front sub-frame connecting part 55.

The front sub-frame connecting part 55 arranged close to a front end of the front battery pack bottom fender 3 has, generally, a connecting hole structure which is formed on the front battery pack bottom fender 3, and may be matched with the front battery pack bottom fender installation positions 2011 for connections by the bolt structure. The front battery pack connecting parts 4 which are distributed along a rear end edge of the front battery pack bottom fender 3 have also the connecting hole structures, which are similar with the front sub-frame connecting part 55; and generally, the connection of a shell of the battery pack 8 with the front battery pack connecting parts 4 is achieved by the bolt structure.

Figure 17:
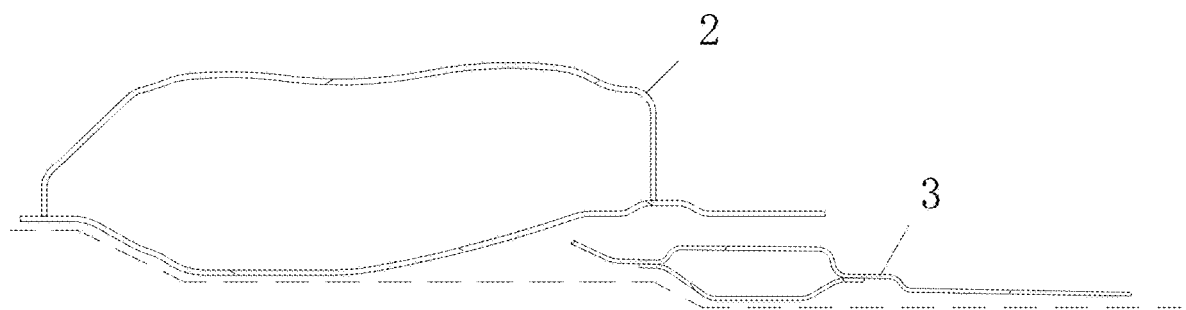
FIG. 17 is a schematic diagram illustrating bottom surfaces of the front sub-frame assembly and the front battery pack bottom fender in the embodiments of the present disclosure.

In addition, as a preferred embodiment, as shown in FIG. 17, a bottom surface of the front sub-frame assembly 2 and the front battery pack bottom fender 3 which are connected, shows a gradually-lowered stair-step shape from the head to the tail of the vehicle, and the lowest position is at least flush with, and even, slightly lower than the bottom of the battery pack 8, so that the vehicle may overcome bellying conditions of curb stones or big stones to put over smoothly, thereby avoiding the frontal collision during traveling.

Figure 18:
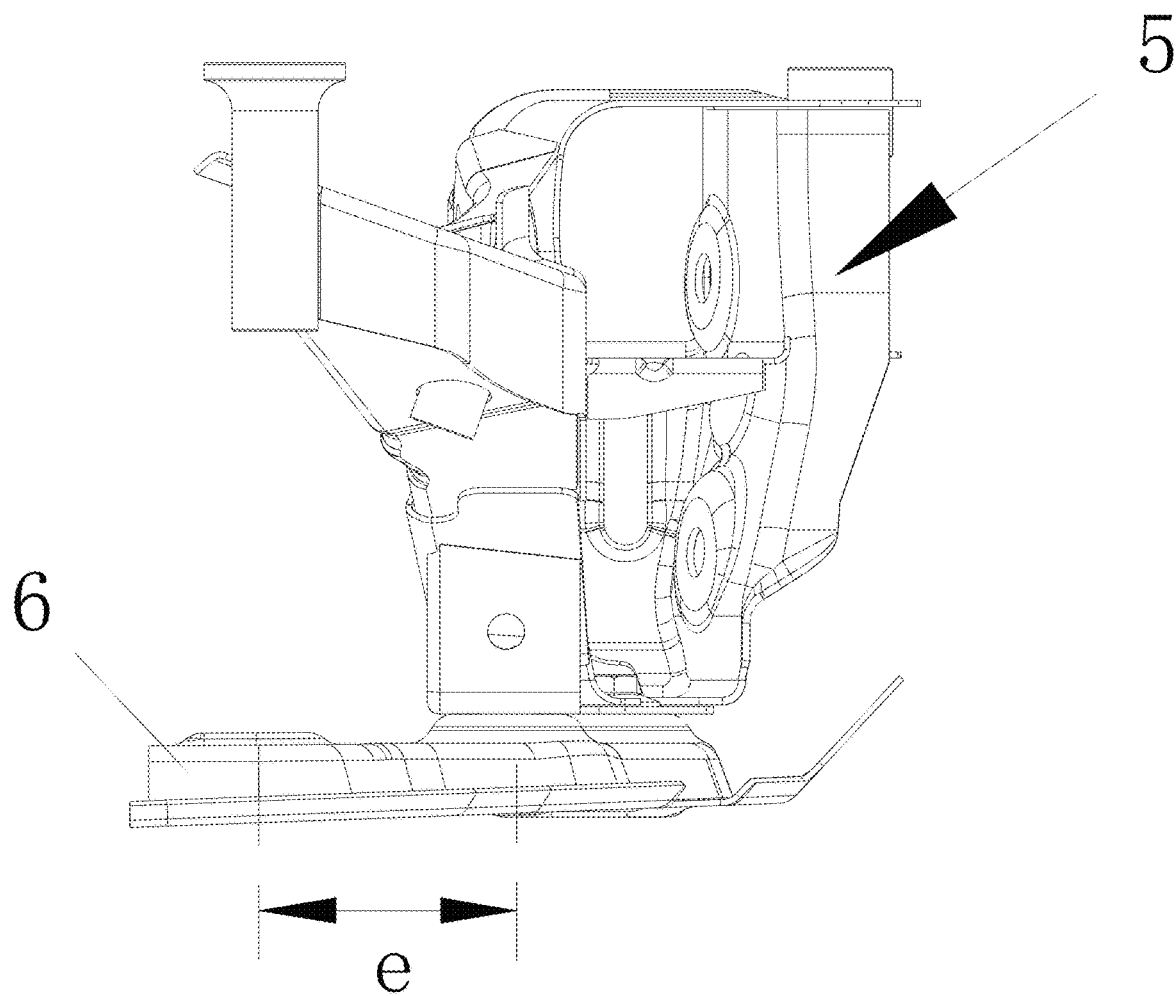
FIG. 18 is a structural schematic diagram illustrating the rear sub-frame assembly and the rear battery pack bottom fender in the embodiments of the present disclosure.
Figure 19:
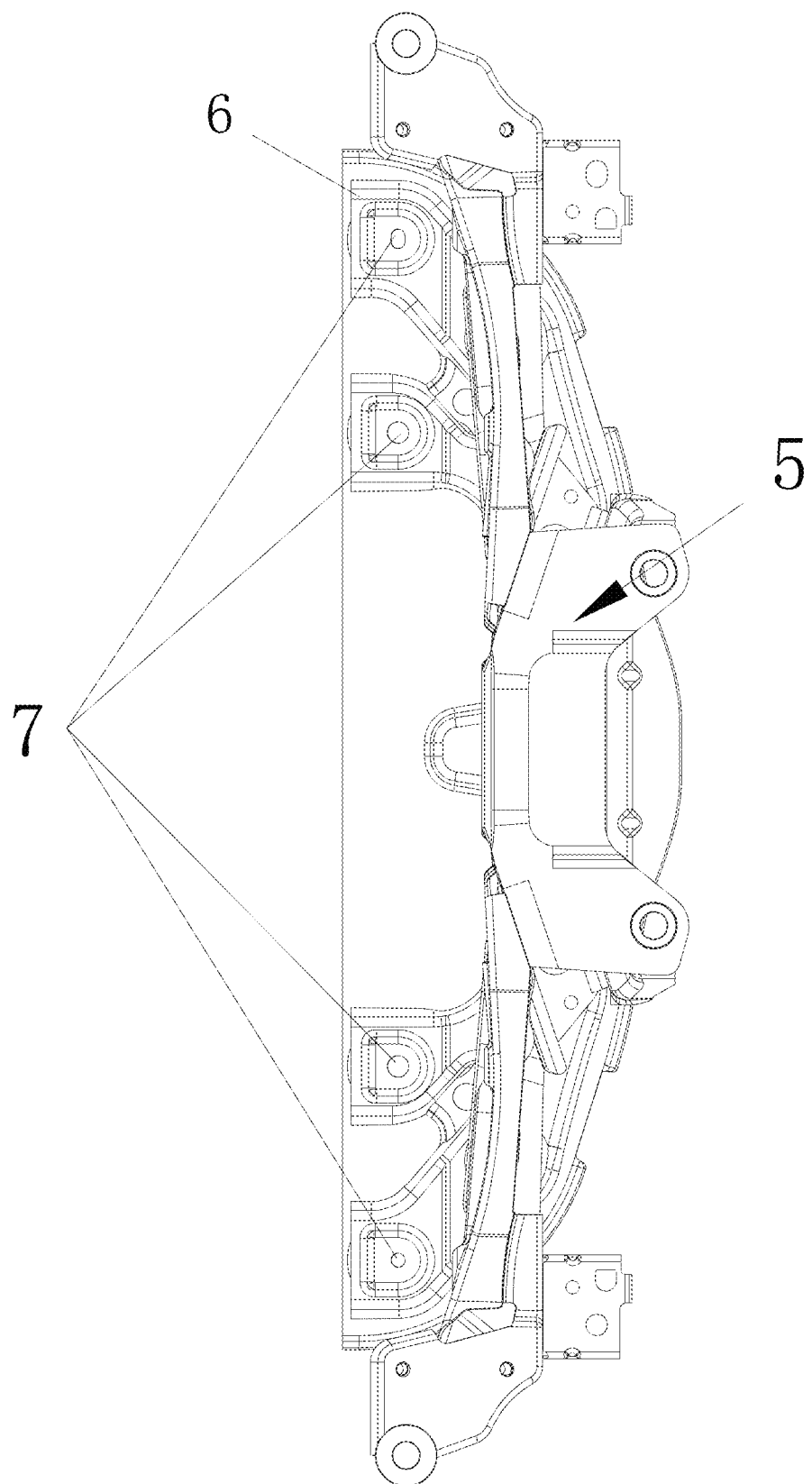
FIG. 19 is a vertical view of FIG. 18.
Figure 20:
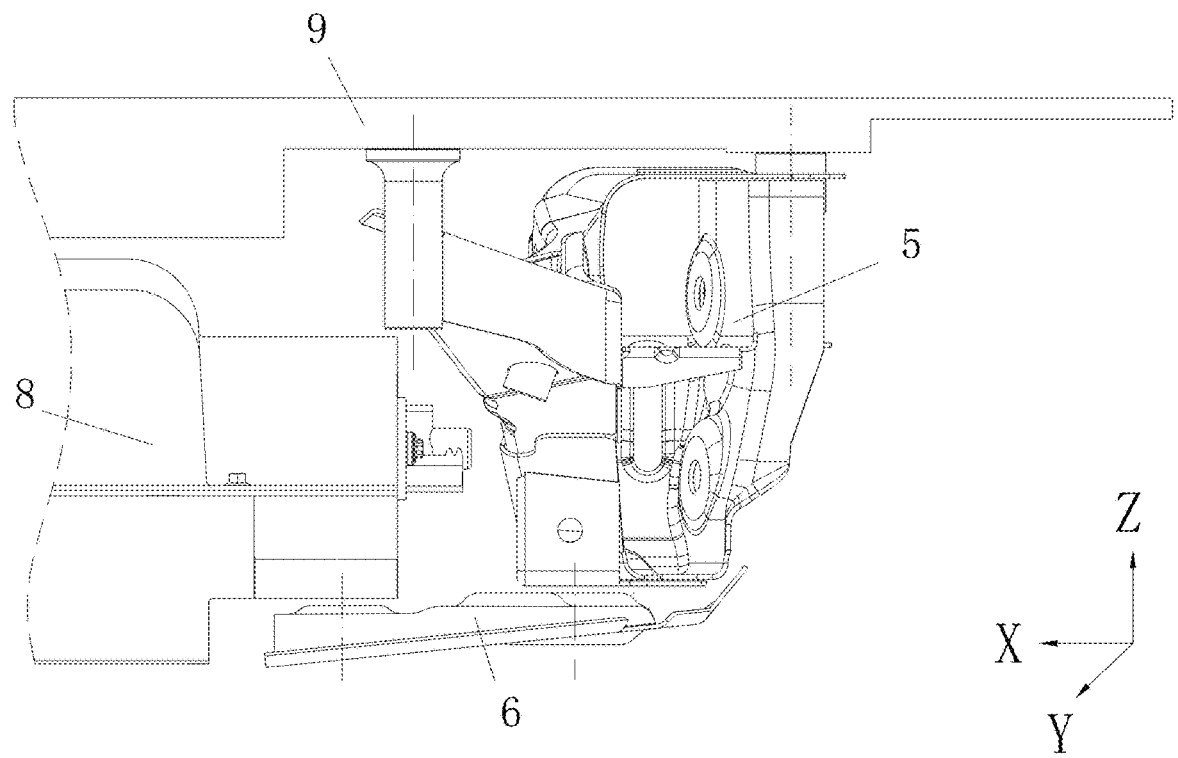
FIG. 20 is an arrangement schematic diagram illustrating the rear sub-frame assembly and the rear battery pack bottom fender in the embodiments of the present disclosure.

In the embodiments, the rear sub-frame assembly 5 is in fit with the rear battery pack bottom fender 6, which is shown in FIGS. 18 to 20; the rear battery pack bottom fender 6 is not only connected to a bottom of the rear sub-frame assembly 5, but is also connected to the bottom of the rear end of the battery pack 8; and the rear sub-frame assembly 5 is in bolted connection with a lower floor assembly 9 in the body by a drive pipe structure arranged on the rear sub-frame assembly.

In the embodiment, the rear sub-frame assembly 5 is shown in FIGS. 21 to 24, which includes a rear sub-frame main body and positioning supports in a structure. As a preferred exemplary form, the rear sub-frame main body has a bilaterally symmetrical structure, on which body connecting parts, rear battery pack bottom fender connecting parts, stabilization bar installation parts, and upper control arm installation parts, and lower control arm installation parts are constructed. Meanwhile, in the embodiment, each body connecting part is arranged on an upper part of the rear sub-frame main body and is connected with the rear sub-frame main body; and each rear battery pack bottom fender connecting part is constructed on a lower part of the rear sub-frame main body and is connected with the rear sub-frame main body.

The two positioning supports are arranged close to two ends of the left end and the right end of the rear sub-frame main body, and positioning parts are constructed on the two positioning supports respectively and may be matched with external positioning parts for positioning the rear sub-frame main body.

In the embodiments, the rear sub-frame assembly 5 has a symmetrical structure, which is easy to form, and compact in the structure, and thus, the dimension and the weight of the rear sub-frame assembly 5 may be reduced. Based on this, in detail, the rear sub-frame main body specifically includes a rear sub-frame body, rear sub-frame cross beams 503, stabilization bar installation supports 502, and lower supports 5010; the rear sub-frame body is located in the middle of the rear sub-frame main body; the rear sub-frame cross beams 503 and the stabilization bar installation supports 502 are arranged on two opposite sides of the rear sub-frame body respectively; and the positioning supports are fixedly connected to the stabilization bar installation supports 502 on the corresponding ends respectively. The lower supports 5010 are arranged and connected between the rear sub-frame cross beams 503 on two sides and the rear sub-frame body respectively.

Figure 21:
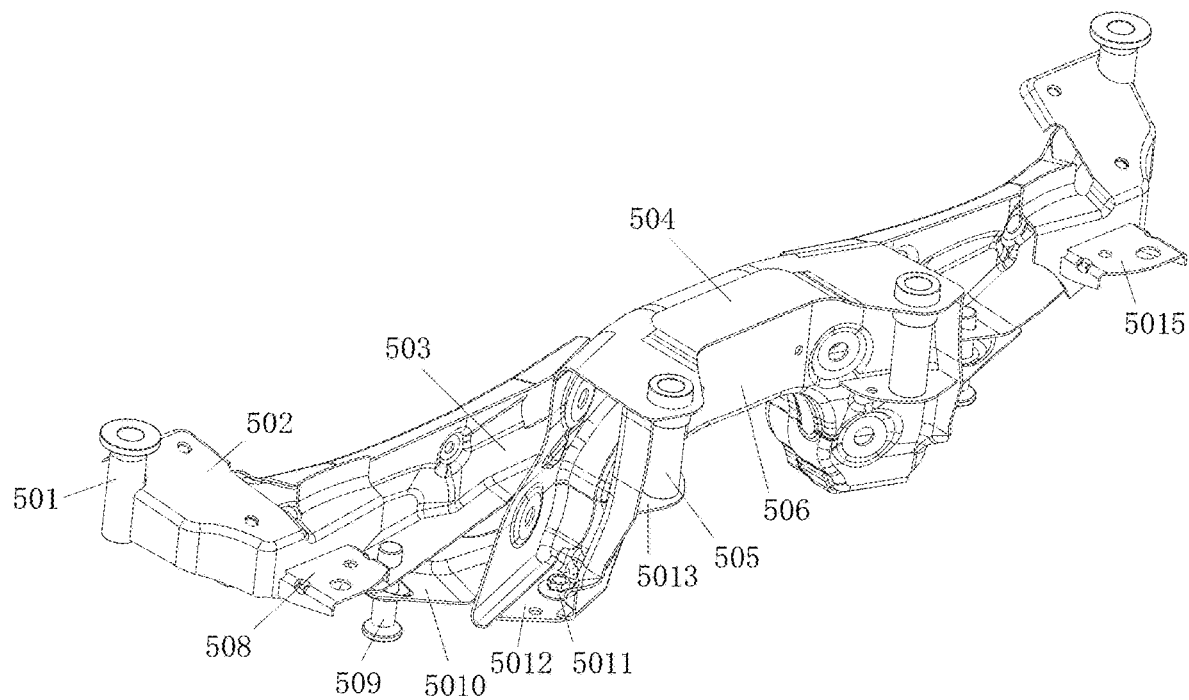
FIG. 21 is a structural schematic diagram of a rear sub-frame assembly in an embodiment of the present disclosure.
Figure 22:
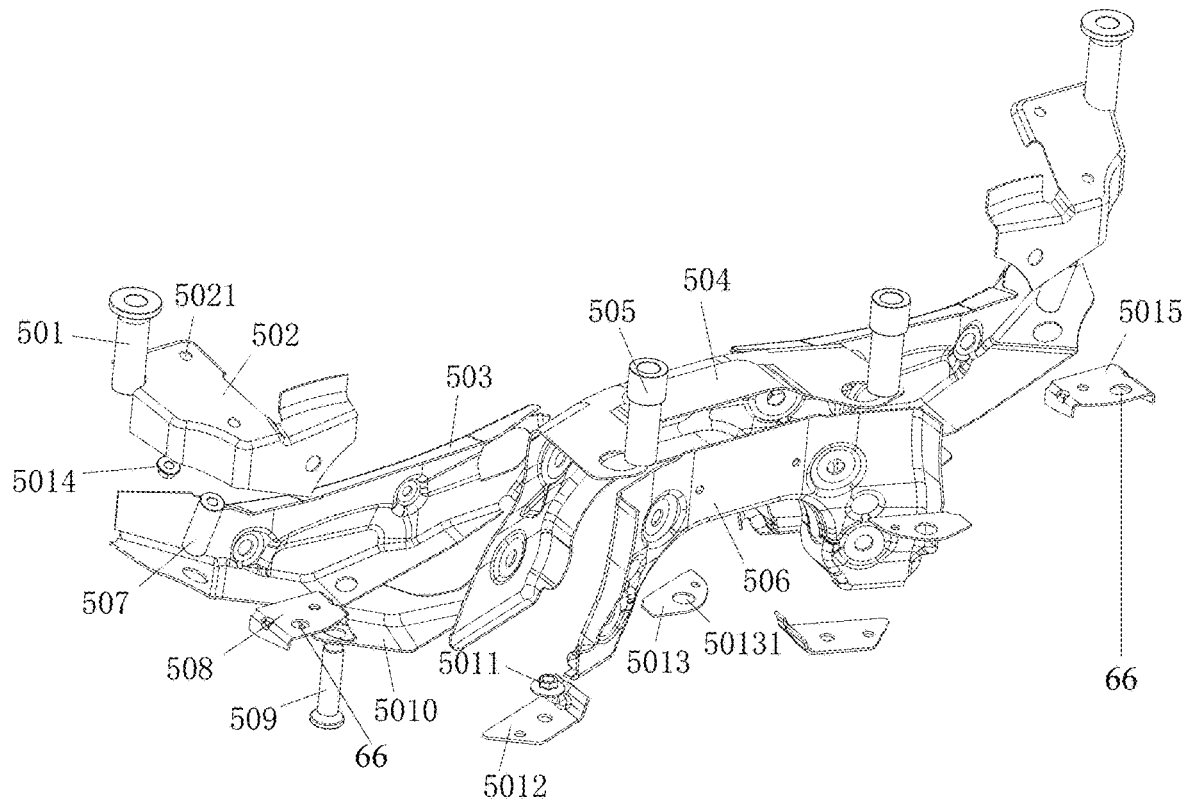
FIG. 22 is an exploded view of FIG. 21.

Still combined with FIGS. 21 and 22, in the embodiments, the rear sub-frame body is provided with a rear sub-frame front panel 504 and a rear sub-frame rear panel 506 which are overlapped fixedly, wherein the rear sub-frame front panel 504 is approximately in an "L" shape, and includes a vertical panel extending along the height direction of the vehicle, and a transverse panel extending to the tail along the length direction of the vehicle. In addition, two convex parts which are convex outwards and mutually symmetric are also formed on the cross plate, and first through holes allowing vehicle body rear mounting position supporting pipes 505 to penetrate are formed in the convex parts.

In the embodiment, the rear sub-frame rear panel 506 has a plate structure which bends towards the head approximately, and a top is in overlap joint with the transverse panel of the rear sub-frame front panel 504. Preferably, an amount of overlap between the rear sub-frame rear panel 506 and the rear sub-frame front panel 504 is set as 4 mm that they have good anti-rust performance, while achieving reduction in the overall weight. Of course, the specific number value of the amount of overlap may be correspondingly adjusted according to specific conditions besides 4 mm.

It should be noted that in order to improve the using effect, as shown in the FIG. 21, inner reinforcement panels 5012 are fixedly connected to a bottom of the rear sub-frame front panel 504 and a bottom of the rear sub-frame rear panel 506. With respect to the bulged parts, rear installation position support panels 5013 are fixedly connected to the bottom of the rear sub-frame rear panel 506, and second through holes 50131 which are aligned with the first through holes are formed in the rear installation position support panels 5013.

In the embodiments, the rear sub-frame cross beams 503 on the two sides are in fixed overlap joint with the rear sub-frame front panel 504; and the lower supports 5010 on the two sides are fixedly connected between the rear sub-frame front panel 504 and the bottom of the rear sub-frame cross beam on the corresponding side. Preferably, the amount of overlap between the rear sub-frame cross beams 503 and the rear sub-frame is 4 mm to improve the anti-rust performance. Of course, the specific number value of the amount of overlap may be correspondingly adjusted according to specific conditions besides 4 mm.

In the embodiments, the rear sub-frame cross beams 503 are approximately in "L" shapes, and includes cross beam main bodies arranged along the width direction of the vehicle and bending parts which bend and extend towards the head direction of the vehicle. In addition, flanges which fold over towards one side of the rear sub-frame front panel 504 are formed on the two ends of the upper end and the lower end of the rear sub-frame cross beams 503; and the rear sub-frame cross beams 503 are in fixed overlap joint with the rear sub-frame front panel 504 by the flanges, and the amount of overlap between the rear sub-frame cross beams 503 and the rear sub-frame front panel 504 is also 4 mm preferably. In addition, the first installation grooves at which the front installation position support pipes 501 of body are arranged are formed at the ends of the flanges at the lower ends of the rear sub-frame cross beams.

In the embodiments, each of stabilization bar installation supports 2 shows an "L" shape integrally, and is fixedly connected with the cross beam main bodies and the bending parts of the rear sub-frame cross beams 503 respectively, thereby improving the stability of the stabilization bar installation supports 502 in arrangement. In addition, two run-through holes 5021 which are distributed at intervals are formed in the stabilization bar installation supports 502, through which bolts, and other external connecting parts may pass. In addition, second installation grooves at which the front installation position support pipes 501 of body are arranged are formed at the ends of the stabilization bar installation supports 502.

It should be noted that in order to improve the present disclosure effect of the rear sub-frame assembly, both a plurality of body connecting parts and a plurality of rear battery pack bottom fender connecting parts on the rear sub-frame assembly 5 are bilaterally symmetrical on the rear sub-frame main body, and that as a preferred embodiment, the quantity of body connecting parts and the rear battery pack bottom fender connecting parts are both four. In the embodiments, based on structures and operational performance of the existing stabilization bars and control arms, the stabilization bar installation parts, the upper control arm installation parts, and the lower control arm installation parts are two groups, which are bilaterally symmetrical on the rear sub-frame main body.

Wherein, the body connecting parts on the rear sub-frame assembly 5 includes the front installation position support pipes 501 of body and rear installation position support pipes 505 of body specifically; and the front installation position support pipes 501 of body are embedded into the first installation grooves and the second installation grooves, and are fixedly connected with the rear sub-frame cross beams 503 and the stabilization bar installation supports 502 respectively. The vehicle body rear mounting position supporting pipes 505 transversely penetrate through the rear subframe front plate 504, specifically penetrate into the above first through holes and the above second through holes 50131, and are also fixedly connected with the rear subframe front plate 504 and rear mounting position supporting pipes. It should be noted that in addition to the front installation position support pipes 501 of body and the rear installation position support pipes 505 of body, the body connecting parts on the rear sub-frame assembly 5 further include other structures by which the rear sub-frame assembly 5 is connected with the body.

As shown in FIGS. 21 and 22, the rear battery pack bottom fender connecting parts of the embodiment include extra-fender installation position threaded pipes 509 and intra-fender installation position welded nuts 5011. Wherein the guard plate outer mounting position threaded pipes 509 are arranged on the lower supports 5010 and the rear subframe cross beams 503 in a penetrating manner and fixedly connected with the lower supports and the rear subframe cross beams, thus, the guard plate outer mounting position threaded pipes, the lower supports and the rear subframe cross beams may be connected to be one body, so as to effectively improve the overall rigidity of the rear subframe main body. The intra-fender installation position welded nuts 5011 are fixedly arranged on one side of each of the inner reinforcement panels 5012, which faces towards the rear sub-frame front panel 504, and via holes are formed in the inner reinforcement panels 5012 with respect to the intra-fender installation position welded nuts 5011, so that the bolts, and other external connecting pieces pass through the via holes and are in threaded connection with the intra-fender installation position welded nuts 5011.

It should be noted that in addition to the extra-fender installation position threaded pipes 509 and the intra-fender installation position threaded pipes, the rear battery pack bottom fender connecting parts further includes other structures by which the rear sub-frame assembly 5 is connected with the rear battery pack bottom fender 6.

In the embodiment, the stabilization bar installation parts on the rear sub-frame assembly 5 specifically include stabilization bar installation position welded nuts 5014 and stabilization bar installation position threaded pipes 507; and the stabilization bar installation position welded nuts 5014 are arranged corresponding to the run-through hole 5021 close to ends of the stabilization bar installation supports 502, and are fixedly connected to lower surfaces of the stabilization bar supports. The stabilization bar installation position threaded pipes 507 are arranged corresponding to the other run-through hole 5021, are arranged across the flanges on the lower ends of the rear sub-frame cross beams 503, and are fixedly connected with the flanges and the stabilization bar installation supports 502.

Figure 23:
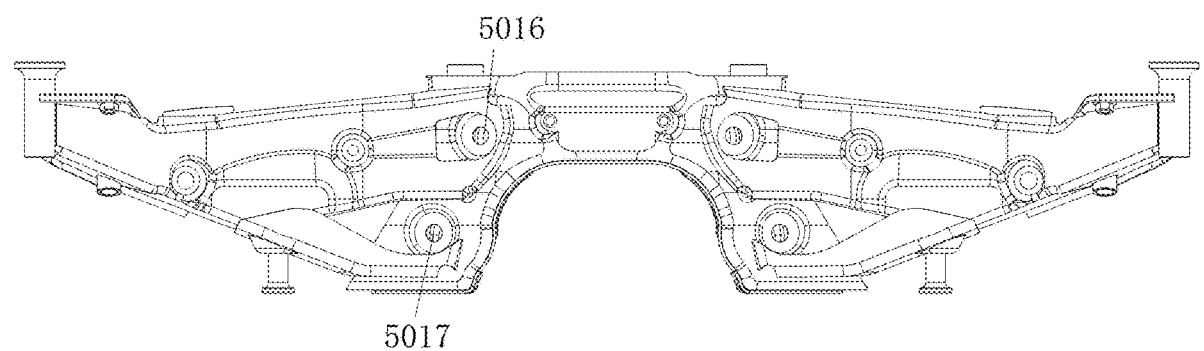
FIG. 23 is a left view of FIG. 21.
Figure 24:
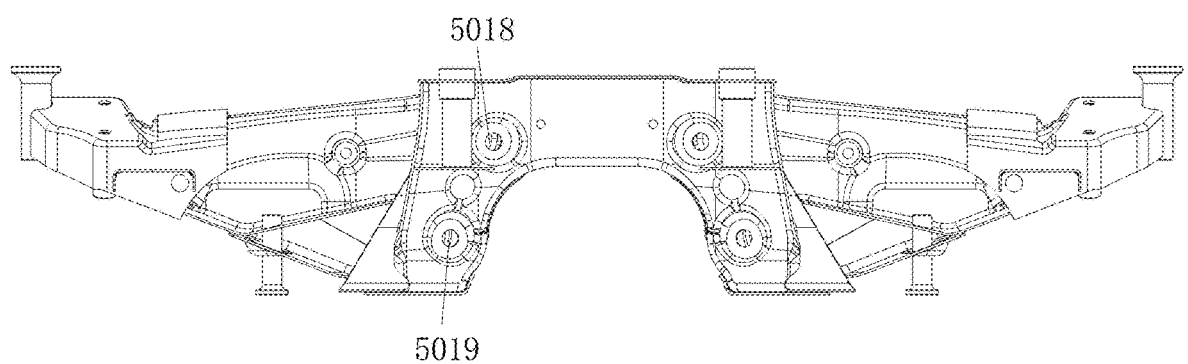
FIG. 24 is a right view of FIG. 21.

With reference to FIGS. 23 and 24 based on FIG. 22, the upper control arm installation parts on the rear sub-frame assembly 5 consist of the upper control arm installation positions 5016 of front panel and the upper control arm installation positions 5018 of rear panel which are arranged on the rear sub-frame front panel 504 and the front sub-frame rear panel 506; and the two upper control arm installation positions are located on the same height of the rear sub-frame main body, which are through holes. Similarly, the lower control arm installation parts on the rear sub-frame assembly 5 of the embodiments consist of lower control arm installation positions 5017 of front panel and lower control arm installation positions 5019 of rear panel which are correspondingly arranged on the rear sub-frame front panel 504 and the front sub-frame rear panel 506; and the two lower control arm installation positions are located on the same height of the rear sub-frame main body, which are through holes.

It should be illustrated that in addition to the through holes, other installation structures which are used commonly by a person skilled in the art may also be used as each control arm installation position on the rear sub-frame assembly 5.

In addition, the two positioning supports in the rear sub-frame assembly 5 specifically include a main positioning support 508 on a left side and an auxiliary positioning support 5015 on a right side, wherein both of which have the same in overall structures, and are fixedly connected to lower parts of the rear sub-frame cross beams 503 on the corresponding side; and positioning parts formed in the two positioning supports are positioning holes 66, and positioning pins may be used as the positioning parts. It should be illustrated that in order to facilitate the installation of the rear sub-frame assembly 5 of the embodiment, the positioning hole 66 in the main positioning support 508 is a circular hole, and the positioning hole 66 in the auxiliary positioning support 5015 is a strip hole.

In the embodiment, the rear sub-frame assembly 5 is connected with the body by four installation positions on an upper end, and is connected with the rear battery pack bottom fender 6 by four installation positions on a lower end, so that the overall stiffness of the rear sub-frame assembly 5 may be improved effectively, thereby achieving better lateral stiffness and operation stability of a chassis structure with the rear sub-frame assembly 5; and meanwhile, the arrangement of a plurality of fixed structures in the rear sub-frame assembly 5 may also facilitate the installation of rear axle stabilization bars and control arms.

Figure 25:
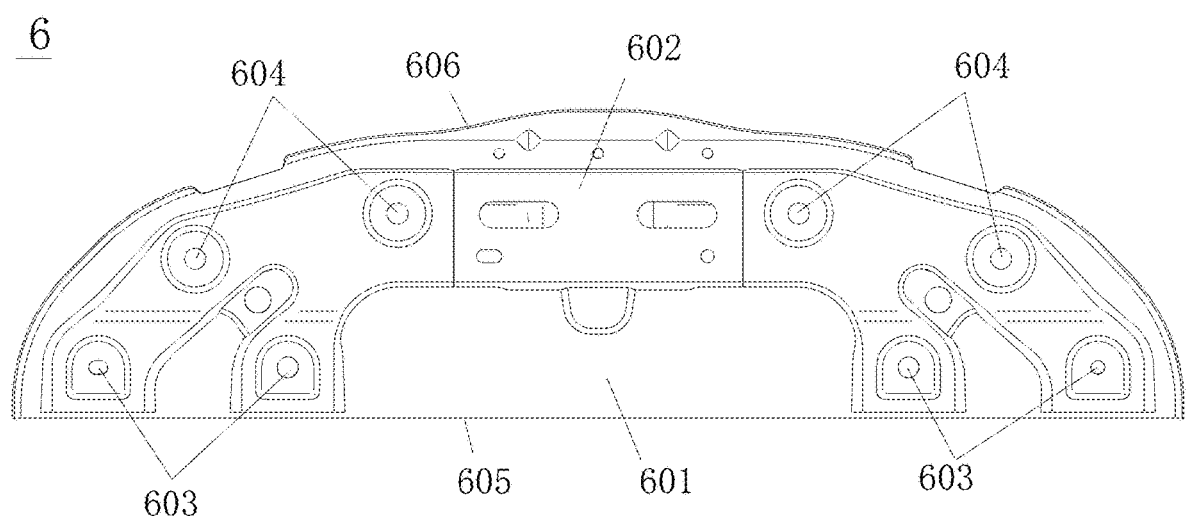
FIG. 25 is a structural schematic diagram illustrating the rear battery pack bottom fender in the embodiments of the present disclosure.
Figure 26:
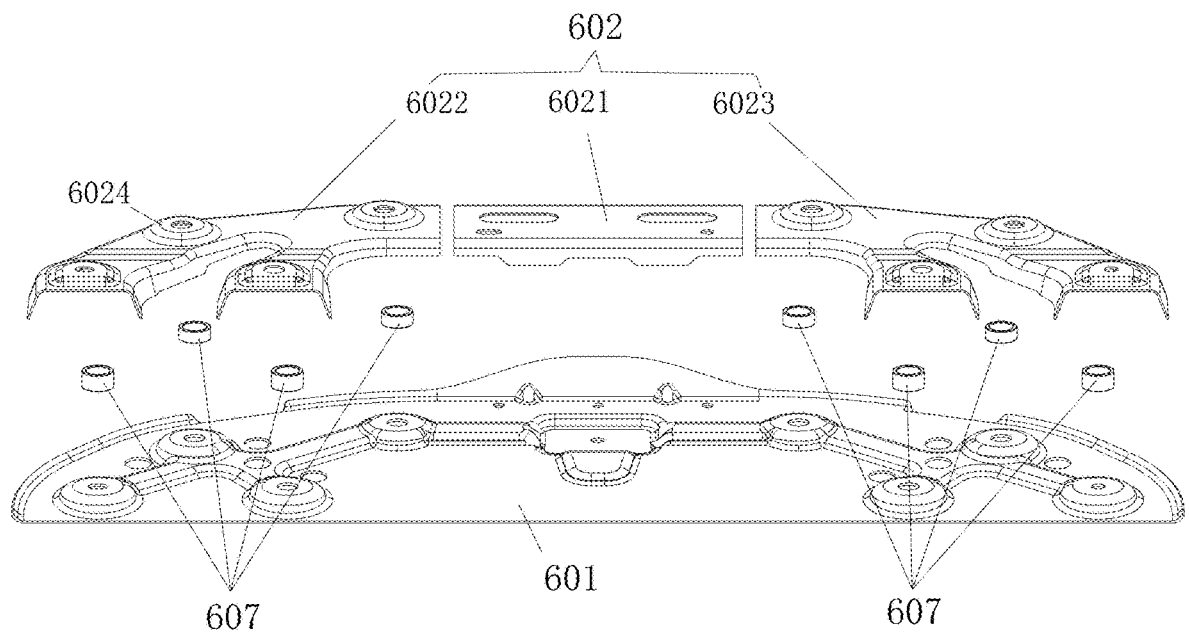
FIG. 26 is an explosive view of FIG. 25.
Figure 27:
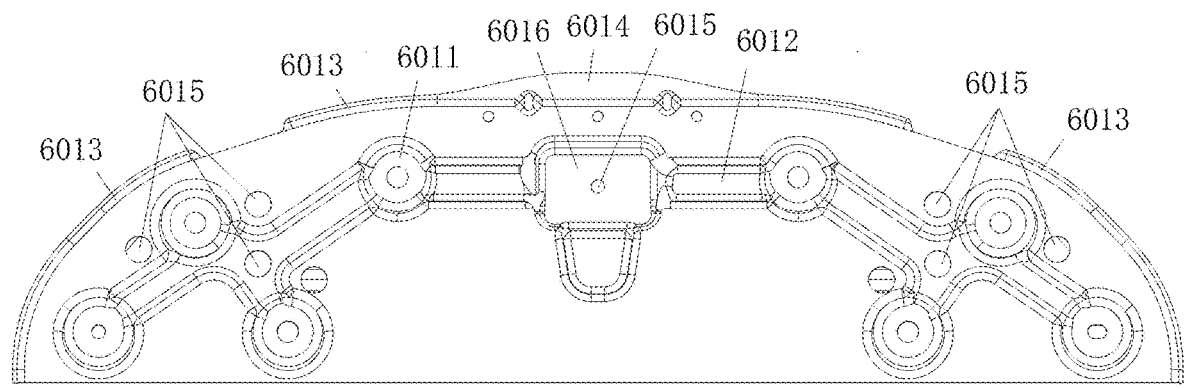
FIG. 27 is a structural schematic diagram illustrating the bottom fender in the embodiments of the present disclosure.

In the embodiment, a structure of the rear battery pack bottom fender 6 is shown in FIGS. 25 to 27, the rear battery pack bottom fender 6 may protect the rear end of the battery pack 8, and includes a bottom fender body which consists of a top fender 602 and a bottom fender 601 which are buckled fixedly from top to bottom; a plurality of rear battery pack connecting parts 7 which are connected with the battery pack 8 are constructed on one side of the bottom fender body, and meanwhile, a plurality of rear sub-frame connecting parts which are connected with the rear sub-frame assembly 5 are constructed on the other side of the bottom fender body with respect to the rear battery pack connecting parts 7.

As a preferred embodiment, each rear battery pack connecting part 7 and each rear sub-frame connecting part are connecting holes formed in the bottom fender body, at this moment, each connecting hole runs through the top fender 602 and the bottom fender 601; and for convenience for description, each connecting hole in the rear battery pack connecting parts 7 is a battery pack connecting hole 603, while each connecting hole in the rear sub-frame connecting parts is called a rear sub-frame connecting hole 604. Particularly, the bottom fender body is connected with the battery pack 8 and the rear sub-frame assembly 5 by a bolt pair structure which runs through the connecting holes.

In order to improve the structural strength of positions where the connecting holes are formed, bulges are constructed on the top fender 602 and the bottom fender 601 with respect to each connecting hole, which are in one-to-one correspondence; and each connecting hole runs through each bulge corresponding to the connecting hole. At this moment, in combined with FIG. 27, each bulge on the top fender 602 is a top fender bulge 6024, and each bulge on the bottom fender 601 is a bottom fender bulge 6011. Each top fender bulge 6024 and each bottom fender bulge 6011 may have a boss-like bulged structure, which may be formed by stamping at corresponding positions on the top fender 602 and the bottom fender 601.

As shown in the FIG. 26, a section of the top fender 602 shows an inverted U shape, and in order to further improve the structural strength at each connecting hole, a support pipe 607 is also clamped between the top fender 602 and the bottom fender 601 corresponding to each connecting hole. The support pipe 607 uses an ordinary steel pipe, which may be welded at each bottom fender bulge 6011 of the bottom fender 601 and then, is fixed between the top fender and the bottom fender along, while being welded between the top fender 602 and the bottom fender 601.

In the embodiment, the top fender 602 may be formed by a mono-block sheet metal, which is the same as the bottom fender 601. However, as a preferred embodiment, the specific design of the embodiment makes that the top fender 602 includes a straight middle connecting panel 6021, and an upper left panel 6022 and an upper right panel 6023 which are fixedly connected to two ends of the middle connecting panel 6021. Wherein, the middle connecting plate 6021 is in welded connection with the upper left panel and the upper right panel, and the rear sub-frame connecting holes 604 are distributed in the upper left panel 6022 and the upper right panel 6023 on two ends. The top fender 602 uses the structure form consisting of the middle connecting panel 6021, the upper left panel 6022 and the upper right panel 6023, so that the whole top fender 602 is easier to form on the basis of obtaining the straight middle connecting panel 6021. And the convenience of the forming is more significant in bifurcated structures on one end of the upper left panel and one end of the upper right panel as described below.

As the bottom fender 601 is used as a structural basis in the whole bottom fender body, in order to further improve the structural strength of the bottom fender 601, a bulged reinforcing rib 6012 is also formed on the bottom fender 601 in the embodiment; and as shown in FIG. 27, the reinforcing rib 6012 may extend on the bottom fender 601, so that at least part of bottom fender bulges 6011 on the bottom fender 601 are connected together. Meanwhile, the upper left panel 6022 and the upper right panel 6023 in the top fender 602 are also consistent with the extension structure of the reinforcing rib 6012 on the bottom fender 601, so that one end of the upper left panel and one end of the upper right panel are in bifurcated forms.

In the embodiment, as a preferred embodiment of an overall protective structure, the bottom fender body is provided with a linear first edge 605 which is located on one side of each rear battery pack connecting part, and a second edge 606 which is located on one side of each rear sub-frame connecting part and extends to be connected with two ends of the first edge 605 in the overall design; and the second edge 606 is in an arc shape. Meanwhile, the top fender 602 is flushed with the bottom fender 601 at the first edge 605, the bottom fender 601 extends outwards against the top fender 602 at the second edge 606, so that an edge of the top fender 602, corresponding to the second edge 606, locates inside of the bottom fender 601.

In terms of the overhanging of the bottom fender 601 corresponding to one side of the second edge 606, a flange 6013 is constructed on an overhang edge of the bottom fender 601; the flange 6013, for example, may be divided into segments at intervals along an arc edge of the bottom fender 601; and the flange 6013 is constructed in the middle of the second edge 606. It should be noted that an up-dip bulged part 6014 is also arranged at the flange 6013 located in the middle of the second edge 606. Due to the arrangement of the bulged part 6014, the probability of the damage of the curb stones to the battery pack 8 may be reduced during reversing, which will be described in details as follows.

In the embodiment, as a preferred structural form, a bulged dimension of the bulged part 6014 may be reduced gradually from the middle to the both sides, as shown in FIG. 27. In addition, a plurality of drain holes 6015 are constructed on the bottom fender 601 in the embodiment, and a planar lifting contact part 6016 is also formed on the bottom fender 601 corresponding to the middle connecting panel 6021. The lifting contact part 6016 is a plane which is formed in the middle of the bottom fender 601; and the plane is aligned with the straight middle connecting panel 6021 from top to bottom, so that the structural stiffness of the lifting contact part 6016 may be improved to ensure safety during lifting.

Figure 28:
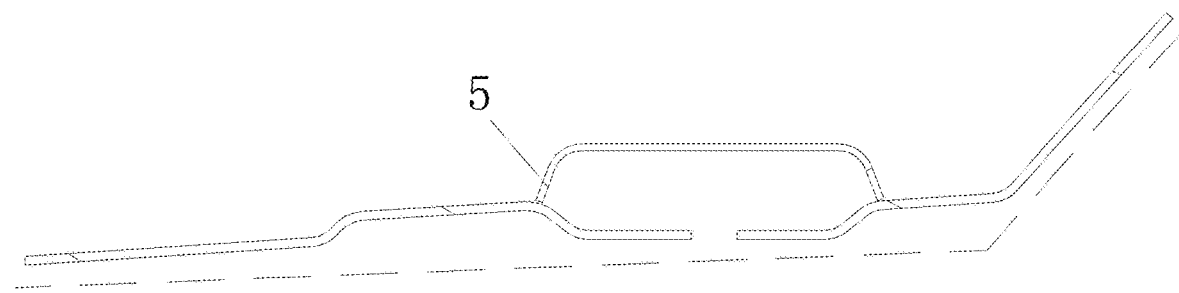
FIG. 28 is a schematic diagram illustrating a bottom surface of the rear battery pack bottom fender in the embodiments of the present disclosure.

In addition, it should be illustrated that as a preferred arrangement form, a bottom surface of the rear battery pack bottom fender 6 is a down-dip form along the direction from the tail to the head of the vehicle, that is, the direction from the rear sub-frame assembly 3 to the battery pack 8, as shown in the FIG. 28. By the inclined arrangement, the vehicle may overcome bellying conditions of curb stones or big stones to put over smoothly, thereby avoiding the frontal collision during reversing.

In the embodiment, with the better structural strength, the rear battery pack bottom fender 6 may provide a comprehensive protection on the rear end of the battery pack 8 using the expansion protection between the rear sub-frame assembly 5 and the battery pack 8. Stagnant water flowing into the rear battery pack bottom fender 6 may be drained in time in combination with the inclined arrangement of the rear battery pack bottom fender 6 on the basis of the arrangement of the drain holes 6015 in the bottom fender 601, which may reduce the risks of the rusting of a protective structure.

Figure 29:
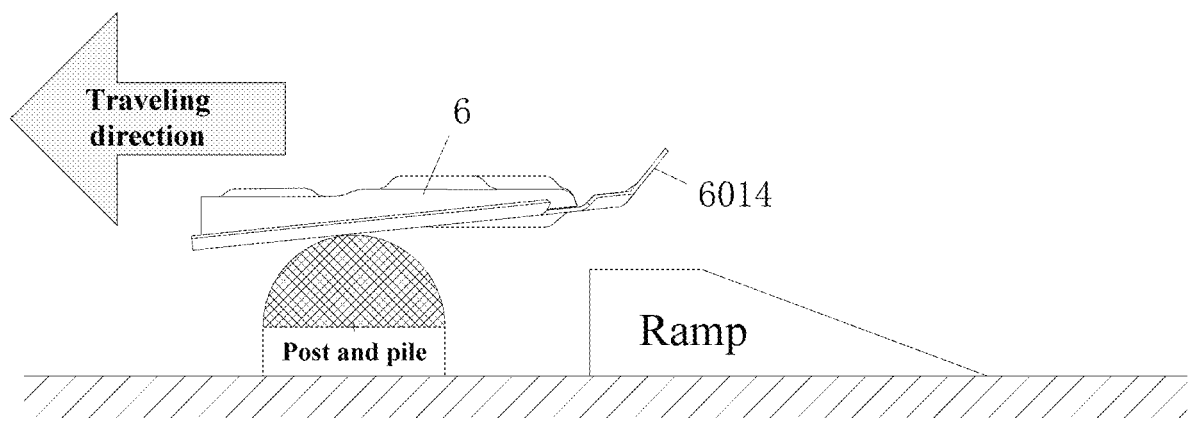
FIG. 29 is a schematic diagram illustrating the fall-off condition of the vehicle in the embodiments of the present disclosure.
Figure 30:
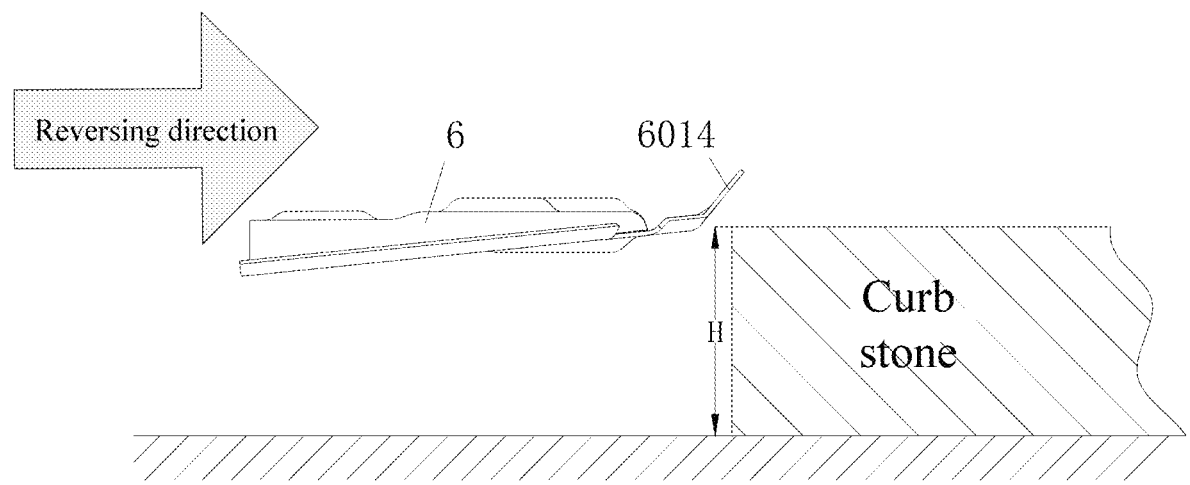
FIG. 30 is a schematic diagram illustrating the curb stone condition in the embodiments of the present disclosure.

In addition, as shown in the FIGS. 29 and 30, taking the fall-off and reversing conditions of the vehicle as instances, in case of the fall-off condition of the vehicle, the rear battery pack bottom fender 6 may effectively protect the rear end of the battery pack 8 against damage when coming into contact with obstacles, such as posts and piles after rear wheels of the vehicle fall to the ground across an abrupt slope. During the curb stones condition of reversing of the vehicle, in case of with a design mode of the rear battery pack bottom fender 6 which is arranged lower at first and higher in the end, and especially the design of an outer bulge 1014 at a middle flange 1013, a structural body 1 and the tail of the vehicle may be lifted up to achieve guiding the curb stones to go forward, thereby protecting the vehicle against the collision of the curb stones.

In the embodiment, the chassis collision structure utilizes the front lower collision beam assembly 1, the front sub-frame assembly 2, the front battery pack bottom fender 3, the rear battery pack bottom fender 6, and the rear sub-frame assembly 5 arranged sequentially along the length direction of the vehicle, so that the front lower collision beam assembly 1, the front sub-frame assembly 2, and the front battery pack bottom fender 3 are connected together, the rear battery pack bottom fender 6 is connected with the rear sub-frame assembly 5, meanwhile the battery pack 8 may also be connected to the front battery pack bottom fender and the rear battery pack bottom fender, so that an collision system which is located at the vehicle chassis may be formed utilizing the above structures in combination with the battery pack 8 connected therewith.

In the collision system, five collapsing deformation intervals a, b, c, d, and e which are arranged sequentially from the head to the tail of the vehicle may be formed in the whole collision structure in combination with each collapsing deformation intervals formed on the longitudinal beams 201 of sub-frame in the front sub-frame assembly 2. Wherein, referring to FIG. 1, a is an energy absorbing interval of the front lower collision beam assembly 1; b and c are energy absorbing intervals of front ends of the longitudinal beams 201 of sub-frame, in which collision collapsing interval is provided, while ensuring the dynamic stiffness of front mounting installation points and large and small bushing installation points of swing arms; d is a deformation interval of rear ends of the longitudinal beams 201 of sub-frame and the front battery pack bottom fender 3; and e is a deformation interval of the rear battery pack bottom fender 6. In the embodiment, with the structural design of each part, the deformation of the chassis structure may be guided to be caused or increased in specific areas, which may improve the collision performance of the chassis of the new energy vehicle.

The above descriptions are merely the better embodiments of the present disclosure, which are not intended to limit the present disclosure. Any modification, equivalent replacement, improvement, etc. made within the spirit and principle of the present disclosure should fall within the scope of protection of the present disclosure.

The invention claimed is:

1. A chassis collision structure of a new energy vehicle, wherein the chassis collision structure of the new energy vehicle comprises a front lower collision beam assembly (1), a front sub-frame assembly (2), a front battery pack bottom fender (3), a rear battery pack bottom fender (6), and a rear sub-frame assembly (5) which are arranged sequentially along a direction from a head to a tail of the vehicle, wherein the front lower collision beam assembly (1) is connected to a front end of the front sub-frame assembly (2); the front battery pack bottom fender (3) is connected to a bottom of the front sub-frame assembly (2); the rear battery pack bottom fender (6) is connected to a bottom of the rear sub-frame assembly (5); and connecting parts which are connected with a battery pack (8) are arranged at one end of the front battery pack bottom fender (3) and one end of the rear battery pack bottom fender (6), which are close to each other, respectively;

wherein the rear battery pack bottom fender (6) comprises a bottom fender body which consists of a top fender (602) and a bottom fender (601) which are buckled fixedly from top to bottom; a plurality of rear battery pack connecting parts (7) are arranged on one side of the bottom fender body, and a plurality of rear sub-frame connecting parts which are connected with the rear sub-frame assembly (5) are constructed on the other side of the bottom fender body with respect to the rear battery pack connecting parts (7); and the rear battery pack connecting parts (7) and the rear sub-frame connecting parts are connecting holes which are formed in the bottom fender body.

2. The chassis collision structure of the new energy vehicle according to claim 1, wherein the front lower collision beam assembly (1) comprises energy-absorbing boxes (102) which are arranged on two sides, and a front lower collision beam (101) which is connected with the energy-absorbing boxes (102) on the two sides; and a length (L) of the front lower collision beam (101), which is located between centers of the energy-absorbing boxes (102) on the two sides, is larger than 50% of an overall width of the vehicle.

3. The chassis collision structure of the new energy vehicle according to claim 1, wherein the front sub-frame assembly (2) comprises longitudinal beams (201) of the sub-frame, which are arranged on the two sides, a front cross beam (202) of the sub-frame, which is connected between the longitudinal beams (201) of the sub-frame on the two sides and is close to a front end of the longitudinal beams (201) of the sub-frame, and a rear cross beam (203) of the sub-frame, which is close to a rear end of the longitudinal beams (201) of the sub-frame with respect to the front cross beam (202) of the sub-frame; body connecting parts are arranged on the longitudinal beams (201) of the sub-frame; and the front sub-frame assembly (2) further comprises two powertrain front mounting installation parts (209) which are arranged relatively on the two sides, and a powertrain rear mounting installation part (2010) which is arranged on the rear cross beam (203) of the sub-frame.

4. The chassis collision structure of the new energy vehicle according to claim 3, wherein the body connecting parts on the longitudinal beams (201) of the sub-frame comprise a front connecting part (205) of body, a middle connecting part (2012) of body, and a rear connecting part (2016) of body which are arranged on the longitudinal beams (201) of the sub-frame along a length direction of the longitudinal beams (201) of the sub-frame; and the powertrain front mounting installation part (209) on each side is arranged close to a junction of the front cross beam (202) of the sub-frame and the longitudinal beam (201) of the sub-frame on the side, and is provided with a front cross beam installation position (20901) arranged at the front cross beam (202) of the sub-frame, and a longitudinal beam installation position (20902) arranged at the longitudinal beams (201) of the sub-frame; and the powertrain rear mounting installation part (2010) is located in the middle of the rear cross beam (203) of the sub-frame in a length direction.

5. The chassis collision structure of the new energy vehicle according to claim 4, wherein a front installation position support (206) is fixedly connected to a position which is close to a front end of the longitudinal beams (201) of the sub-frame; each front connecting part (205) of body is a front installation drive pipe (2061) arranged on the front installation position support (206); the front installation drive pipe (2061) is located right above the corresponding longitudinal beams (201) of the sub-frame; and a tool pass-through part, which directly faces the front installation drive pipe (2061), for an external installation tool to pass through is arranged on the corresponding front longitudinal beam (201) of the sub-frame.

6. The chassis collision structure of the new energy vehicle according to claim 4, wherein a front mounting support (207) which extends towards an inside of the longitudinal beam (201) of the sub-frame is fixedly connected to the longitudinal beam (201) of the sub-frame on one side; the longitudinal beam installation position (20902) at a position of the longitudinal beam (201) of the sub-frame on the side is arranged on the front mounting support (207); and the powertrain rear mounting installation part (2010) is provided with a plurality of rear cross beam installation positions (z) which are distributed on the rear cross beam (203) of the sub-frame regularly.

7. The chassis collision structure of the new energy vehicle according to claim 3, wherein stabilization bar installation positions (2014), large bushing installation positions of swing arms (2015), and small bushing installation positions (2017) of swing arms which are opposite to each other are arranged on the longitudinal beams (201) of the sub-frame on the two sides; steering gear installation positions (2013) are arranged on the rear cross beam (203) of the sub-frame; and installation positions (2011) of front battery pack bottom fender are arranged on one side of the rear cross beam (203) of the sub-frame, which is back on to the front cross beam (202) of the sub-frame.

8. The chassis collision structure of the new energy vehicle according to claim 7, wherein the large bushing installation positions (2015) of swing arms are colinear with the stabilization bar installation positions (2014) along a length direction of the longitudinal beams (201) of the sub-frame, and the stabilization bar installation positions (2014) are located on a top of the longitudinal beams (201) of the sub-frame; the large bushing installation positions (2015) of swing arms are provided with first large bushing installation points (20151) and second large bushing installation points (20152) which are arranged at intervals along the length direction of the longitudinal beams (201) of the sub-frame; the first large bushing installation points (20151) are close to the stabilization bar installation positions (2014) and run through a bottom of the longitudinal beams (201) of the sub-frame; and the second large bushing installation points (20152) run through the longitudinal beams (201) of the sub-frame from top to bottom.

9. The chassis collision structure of the new energy vehicle according to claim 3, wherein a plurality of collapsing deformation intervals which are arranged along a length direction of the longitudinal beams (201) of the sub-frame are arranged on the longitudinal beams (201) of the sub-frame; each collapsing deformation interval is provided with a front interval (b) located on a front end of each of the longitudinal beams (201) of the sub-frame, a middle interval (c) close to a middle of each of the longitudinal beams (201) of the sub-frame, and a rear interval (d) located on a rear end of each of the longitudinal beams (201) of the sub-frame, and a collapsing rib (2020) is arranged on the longitudinal beam (201) of the sub-frame at the middle interval (c); and a strip deformation guide port (2021) is formed on the longitudinal beam (201) of the sub-frame at the rear interval (d).

10. The chassis collision structure of the new energy vehicle according to claim 3, wherein a front cross beam inclined plane (20203) which inclines towards an outside of the cross beam (202) of the sub-frame is formed on an upper part of one side of the front cross beam (202) of the sub-frame, which directly faces the rear cross beam (203) of the sub-frame; a curb stone entry part (20303) which extends outwards is arranged on one side of the rear cross beam (203) of the sub-frame, which directly faces the front cross beam (202) of the sub-frame, and an up-dip upper inclined plane (20304) of the rear cross beam and a down-dip lower inclined plane (20305) of the rear cross beam are constructed at a top and a bottom of the rear cross beam (203) of the sub-frame and the curb stone entry part (20303) which are connected, respectively; a planar lifting contact part (20307) is arranged at a bottom of the rear cross beam (203) of the sub-frame; and a front battery pack fender connecting part (20306) which extends outwards is arranged on one side, which is back on to the front cross beam (202) of the sub-frame, of the rear cross beam (203) of the sub-frame.

11. The chassis collision structure of the new energy vehicle according to claim 1, wherein the front battery pack bottom fender (3) is in a triangular shape; and a front sub-frame connecting part (55) is arranged at a position of a vertex angle which is close to the front battery pack bottom fender (3); and the connecting parts which are connected with the battery pack (8) are arranged along an edge of the front battery pack bottom fender (3), which directly faces the front sub-frame connecting part (55).

12. The chassis collision structure of the new energy vehicle according to claim 1, wherein the top fender (602) comprises a straight middle connecting panel (6021), and an upper left panel (6022) and an upper right panel (6023) which are fixedly connected to two ends of the middle connecting panel (6021); the connecting holes are distributed in the upper left panel (6022) and the upper right panel (6023), and one end of the upper left panel (6022) and one end of the upper right panel (6023) are in bifurcated forms; and a planar lifting contact part (6016) is formed on the bottom fender (601), with respect to the middle connecting panel (6021).

13. The chassis collision structure of the new energy vehicle according to claim 1, wherein the bottom fender body is provided with a first edge (605) which is linear and is located on one side of the rear battery pack connecting parts (7), and a second edge (606) which is located on one side of each of the rear sub-frame connecting parts and extends to be connected with two ends of the first edge (605); the second edge (606) is in an arc shape; the bottom fender (601) at the second edge (606) extends outwards with respect to the top fender (602); a flange (6013) is constructed on an overhang edge of the bottom fender (601); a plurality of drain holes (6015) are formed in the bottom fender (601); the flange (6013) located in the middle of the second edge (606) is provided with an up-dip bulged part (6014); and a bulged dimension of the bulged part (6014) is reduced gradually from the middle to the two sides.

14. The chassis collision structure of the new energy vehicle according to claim 1, wherein the rear sub-frame assembly (5) comprises a rear sub-frame main body, and two positioning supports which are arranged close to left ends and right ends of the rear sub-frame main body respectively; body connecting parts and rear battery pack bottom fender connecting parts are constructed on the rear sub-frame main body; stabilization bar installation parts, upper control arm installation parts, and lower control arm installation parts are arranged on the rear sub-frame main body; and positioning parts (66) which are matched with an external positioning element to locate the rear sub-frame main body are constructed on the two positioning supports.

15. The chassis collision structure of the new energy vehicle according to claim 14, wherein the rear sub-frame main body has a bilaterally symmetrical structure, and comprises a rear sub-frame body located in the middle of the rear sub-frame main body, and rear sub-frame cross beams (503) and stabilization bar installation supports (502) which are arranged on two opposite sides of the rear sub-frame body respectively; the rear sub-frame main body further comprises lower supports (5010) which are connected between the rear sub-frame cross beams (503) on two sides and the rear sub-frame body respectively; and the positioning supports at two ends are fixedly connected to the stabilization bar installation support (502) on the corresponding end.

16. The chassis collision structure of the new energy vehicle according to claim 15, wherein the rear sub-frame body is provided with a rear sub-frame front panel (504) and a rear sub-frame rear panel (506) which are in fixed overlap joint; the rear sub-frame cross beams (503) on the two sides are in fixed overlap joint with the rear sub-frame front panel (504); and the lower supports (5010) on the two sides are fixedly connected between the rear sub-frame front panel (504) and the rear sub-frame cross beam (503) on the corresponding sides.

17. The chassis collision structure of the new energy vehicle according to claim 16, wherein an internal reinforcement panel (5012) is fixedly connected between the rear sub-frame front panel (504) and the rear sub-frame rear panel (506), and a rear installation position support panel (5013) is fixedly connected to the rear sub-frame rear panel (506); the plurality of body connecting parts and the plurality of rear battery pack bottom fender connecting parts are bilaterally symmetrical on the rear sub-frame main body; and all of the stabilization bar installation parts, the upper control arm installation parts, and the lower control arm installation parts have two groups that are bilaterally symmetrical with respect to the rear sub-frame main body.

18. The chassis collision structure of the new energy vehicle according to claim 2, wherein a plurality of collapsing parts are arranged at intervals on each energy-absorbing box (102) along a length direction of each energy-absorbing box; and each collapsing part consists of bulges formed on an upper end face and a lower end face of each energy-absorbing box (102), and pits formed on a left end face and a right end face of each energy-absorbing box (102) with respect to the position of the bulges; or each collapsing part is a collapsing hole.

19. The chassis collision structure of the new energy vehicle according to claim 1, wherein a bottom surface of the front sub-frame assembly (2) and the front battery pack bottom fender (3) which are connected show a gradually-lowered stair-step shape along the direction from the head to the tail of the vehicle; and a bottom surface of the rear battery pack bottom fender (6) shows a down-dip shape form along the direction from the tail to the head of the vehicle.

\* \* \* \* \*